United States Patent
Singh et al.

(10) Patent No.: US 12,008,511 B2
(45) Date of Patent: Jun. 11, 2024

(54) SHIPPING CARTON OPTIMIZATION SYSTEM AND METHOD

(71) Applicant: Exel Inc., Westerville, OH (US)

(72) Inventors: Manjeet Singh, Westerville, OH (US); Adrian Kumar, Columbus, OH (US)

(73) Assignee: Exel Inc., Westerville, OH (US)

( * ) Notice: Subject to any disclaimer, the term of this patent is extended or adjusted under 35 U.S.C. 154(b) by 9 days.

(21) Appl. No.: 18/067,930

(22) Filed: Dec. 19, 2022

(65) Prior Publication Data

US 2023/0162127 A1    May 25, 2023

Related U.S. Application Data

(63) Continuation of application No. 16/111,847, filed on Aug. 24, 2018, now Pat. No. 11,531,954.

(51) Int. Cl.
| | |
|---|---|
| G06Q 10/04 | (2023.01) |
| G06Q 10/0832 | (2023.01) |
| G06Q 10/0875 | (2023.01) |
| B65G 1/16 | (2006.01) |
| G06Q 30/0283 | (2023.01) |

(52) U.S. Cl.
CPC ..... *G06Q 10/0832* (2013.01); *G06Q 10/0875* (2013.01); *B65G 1/16* (2013.01); *G06Q 10/04* (2013.01); *G06Q 30/0283* (2013.01)

(58) Field of Classification Search
CPC . G06Q 10/0832; G06Q 10/0875; G06Q 10/04
USPC .................................. 705/332, 7.11, 1, 337
See application file for complete search history.

(56) References Cited

U.S. PATENT DOCUMENTS

| | | |
|---|---|---|
| 6,308,831 B1 | 10/2001 | Saxe et al. |
| 2007/0136150 A1 | 6/2007 | Biancavilla et al. |
| 2010/0049537 A1 | 2/2010 | Erie et al. |
| 2013/0041836 A1 | 2/2013 | Arunapuram |
| 2013/0231773 A1 | 9/2013 | Lee et al. |
| 2014/0172736 A1 | 6/2014 | Saha |
| 2015/0019387 A1 | 1/2015 | Pettersson et al. |
| 2016/0011750 A1 | 1/2016 | Rogers et al. |
| 2017/0061349 A1 | 3/2017 | Zhang |

(Continued)

OTHER PUBLICATIONS

Schiavo, Brian. Making the Most of Every Inch. Fort Atkinson: AC Business Media, 2007. Print. (Year: 2007).*

(Continued)

*Primary Examiner* — Akiba K Robinson
(74) *Attorney, Agent, or Firm* — Standley Law Group LLP; Beverly A. Marsh; Kenny W. Pung

(57) ABSTRACT

Described herein are exemplary systems and methods for the optimization of shipping cartons relative to the contents of orders to be placed therein. An exemplary carton optimization method evaluates a sample size of orders received at a given location and then determines an optimal carton set that includes at least one feasible carton for each order, while also minimizing shipping costs based on dimensional weighing-based pricing by reducing the dimensional weight, thereby minimizing void space and increasing the carton space utilization percentage. An exemplary carton optimization method may be further customized to optimize a carton set for an order, based on the cartons already available at a given warehouse or other site. As a result, cartons are utilized and designed more efficiently at the site.

9 Claims, 20 Drawing Sheets

(56) References Cited

U.S. PATENT DOCUMENTS

2018/0374046 A1 12/2018 Powers et al.
2019/0213389 A1 7/2019 Peruch
2019/0329150 A1 10/2019 Fleming

OTHER PUBLICATIONS

Witt, Clyde E. "Space Equals Money: You Can't Manage What You Don't Measure. So, How Do You Manage—or Measure—All Those Boxes in the Warehouse?" Material handling management 63.3 (2008): 62-. Print. (Year: 2008).*
Specter, Sara Pearson. Measure up: The Use of Cubing and Weighing Equipment Is Growing beyond Dimensional Weight Applications. vol. 72. Peerless Media, LLC, 2017. Print. (Year: 2017).*
Chen, C.S. et al, An Analytical Model for the Container Loading Problem, European Journal of Operational Research 80 (1995) 68-76, Oct. 1993, 9 pages.

* cited by examiner

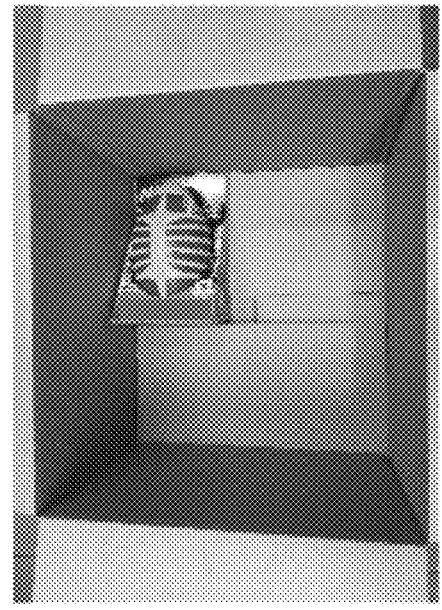

SKU Dimensions(inches): L=11.9, W=3.8, H=3.8
SKU Weight(lbs) = 2

Lets see how much we would pay for a zone 6 of a toy football in 3 different carton sizes:

Scenario – 1 (Best Fit)
- Carton Dimensions (inches): L=12, W=4, H=4
- Dimensional Weight (lbs) = 215.2/166 = 1.2 ≈ 2
- UPS Ground Zone 6 Shipping charge = $6

Scenario – 2 (Large)
- Carton Dimensions (inches): L=18, W=10, H=9
- Dimensional Weight (lbs) = 1620/166 = 9.75 ≈ 10
- UPS Ground Zone 6 Shipping charge = $7

Scenario – 3 (Too Large)
- Carton Dimensions (inches): L=25, W=16, H=10
- Dimensional Weight (lbs) = 4000/166 = 24.1 ≈ 25
- UPS Ground Zone 6 Shipping charge = $12

*FIG. 1*

| Box ID | Box Length | Box Width | Box Height |
|---|---|---|---|
| 1 | 7 | 5 | 4 |
| 2 | 1 | 1 | 1 |
| 3 | 1 | 1 | 1 |
| 4 | 3 | 2 | 0.5 |
| 5 | 1.5 | 1 | 0.5 |
| 6 | 3.5 | 2.5 | 2.5 |
| 7 | 3 | 3 | 1.5 |
| 8 | 1.5 | 1.5 | 1.5 |
| 9 | 2 | 1 | 1 |
| 10 | 8 | 3 | 1 |
| 11 | 7.5 | 3 | 0.5 |

*FIG. 5*

| BOX ID | BOX LENGTH | BOX WIDTH | BOX HEIGHT |
|---|---|---|---|
| 1 | 7 | 5 | 4 |
| 2 | 1 | 1 | 1 |
| 3 | 1 | 1 | 1 |
| 4 | 3 | 2 | 0.5 |
| 5 | 1.5 | 1 | 0.5 |
| 6 | 3.5 | 2.5 | 2.5 |
| 7 | 3 | 3 | 1.5 |
| 8 | 1.5 | 1.5 | 1.5 |
| 9 | 2 | 1 | 1 |
| 10 | 8 | 3 | 1 |
| 11 | 7.5 | 3 | 0.5 |

CARTON LENGTH = 8
CARTON LENGTH = 7.5

| BOX ID | BOX LENGTH | BOX WIDTH | BOX HEIGHT | AREA |
|---|---|---|---|---|
| 1 | 7 | 5 | 4 | 35 |
| 10 | 8 | 2 | 1 | 24 |
| 11 | 7.5 | 3 | 0.5 | 22.5 |
| 7 | 3 | 3 | 1.5 | 9 |
| 6 | 2.5 | 2.5 | 2.5 | 9.75 |
| 4 | 3 | 2 | 0.5 | 6 |
| 8 | 1.5 | 1.5 | 1.5 | 2.25 |
| 9 | 2 | 1 | 1 | 2 |
| 5 | 1.5 | 1 | 0.5 | 1.5 |
| 2 | 1 | 1 | 1 | 1 |
| 3 | 1 | 1 | 1 | 1 |

| BOX ID | BOX LENGTH | BOX WIDTH | BOX HEIGHT | VOLUME(2.0) |
|---|---|---|---|---|
| 1 | 7 | 5 | 4 | 140 |
| 10 | 8 | 3 | 1 | 24 |
| 6 | 5.5 | 2.5 | 2.5 | 21.375 |
| 7 | 5 | 5 | 1.5 | 15.5 |
| 11 | 7.5 | 3 | 0.5 | 11.25 |
| 8 | 1.5 | 1.5 | 1.5 | 3.375 |
| 4 | 5 | 2 | 0.5 | 5 |
| 9 | 2 | 1 | 1 | 2 |
| 2 | 1 | 1 | 1 | 1 |
| 3 | 1 | 1 | 1 | 1 |
| 5 | 1.5 | 1 | 0.5 | 0.75 |

FIT IN CHECK 1 X EMPTY SPACE

FIT IN CHECK 1 Y EMPTY SPACE

FIG. 10

| Current | | | | | | |
|---|---|---|---|---|---|---|
| # of Cartons | Ship Cost ($) 2,500 orders) | Ann. Ship Cost ($) | Annual Savings ($) | Annual Savings (%) | DimWgt Hit (%) | Tot. Carton Util. (%) |
| 15 | $27,318 | $43,708,675 | -- | -- | 97.3% | 44.1% |
| Optimal | | | | | | |
| 10 | $27,303 | $43,684,856 | $24,014 | 0.10% | 98.80% | 42.20% |
| 12 | $26,869 | $42,990,384 | $718,290 | 1.60% | 98.70% | 43.30% |
| 14 | $26,215 | $41,944,064 | $1,764,610 | 4.00% | 98.60% | 44.70% |
| 15 | $26,009 | $41,614,736 | $2,093,933 | 4.80% | 98.40% | 45.40% |
| 16 | $25,931 | $41,490,178 | $2,218,504 | 5.10% | 98.20% | 46.10% |
| 18 | $25,471 | $40,754,032 | $2,954,642 | 6.80% | 98.20% | 47.70% |
| 20 | $25,131 | $40,209,680 | $3,498,993 | 8.00% | 98.10% | 48.70% |
| 22 | $24,874 | $39,799,088 | $3,909,582 | 8.90% | 97.80% | 49.80% |
| 24 | $24,653 | $39,445,328 | $4,263,351 | 9.80% | 97.70% | 50.80% |
| 26 | $24,475 | $39,159,856 | $4,548,823 | 10.40% | 97.60% | 51.50% |
| 28 | $24,274 | $38,838,656 | $4,870,014 | 11.10% | 97.60% | 52.00% |
| 30 | $24,122 | $38,594,960 | $5,113,722 | 11.70% | 97.60% | 52.60% |
| 100 | $23,284 | $37,255,080 | $6,453,595 | 14.80% | 94.80% | 58.80% |
| 2,500 | $20,593 | $32,948,308 | $10,760,367 | 24.60% | 79.90% | 80.00% |

*FIG. 18*

SHIPPING CARTON OPTIMIZATION SYSTEM AND METHOD

CROSS-REFERENCE TO RELATED APPLICATION

This application is a continuation of U.S. Non-Provisional application Ser. No. 16/111,847 filed on Aug. 24, 2018, the disclosure of which is hereby incorporated by reference as if fully recited herein.

TECHNICAL FIELD

Exemplary system and method embodiments described herein are directed to the optimization of shipping cartons relative to the contents of orders to be placed therein.

BACKGROUND

The shipping of goods in containers of one form or another no doubt goes back for centuries. In modern times, the shipping of goods is often accomplished by freight carriers (e.g., common or trucking carriers) and express parcel carriers (e.g., USPS®, UPS®, FedEx®), with some companies providing both services. Freight shipping typically involves larger and/or heavier goods (or pallets of goods), while parcel shipping typically involves smaller goods that meet certain size and weight restrictions.

Freight carrier shipping generally falls into two categories—less than truckload (LTL) and full truckload (FTL). In either case, freight shipping costs have been traditionally based largely, although not entirely, on the weight of the goods being shipped.

Parcel shipping costs were also traditionally based on the weight of the goods being shipped. Consequently, shippers of parcels—even high-volume shippers such as warehouses and the like—did not previously have to give much consideration to the size of the container (carton) in which a given good(s) was shipped, or to the void space within the carton, since the associated shipping cost was based only on the weight of the loaded carton. Consequently, a shipper could previously make use of only a minimal number of carton sizes, because any time a selected carton was (even far) larger than the good being shipped therein, the shipper could simply leave void space in the carton or employ extremely lightweight fill material such as paper, bubble pack, air pillows, foam peanuts, etc., to fill the void space without causing any meaningful increase in the shipping cost.

Beginning in about 2007, however, parcel carriers introduced the concept of "Dimensional Weight" relative to determining parcel shipping costs. Dimensional Weight, also known as "Volumetric Weight'", is calculated by multiplying the length, width and height of the parcel being shipped, and dividing the result by a predetermined factor (i.e., 194 for USPS®; 166 for most other U.S. parcel carriers). The shipping cost for a given parcel is then based on the greater of its calculated Dimensional Weight or its actual weight. While Dimensional Weight shipping costs were initially applicable only to parcels over 3 cubic feet in volume, this changed in 2015 when Dimensional Weight shipping costs were made applicable to all parcels shipped by UPS® and FedEx®. Consequently, the cost to ship any parcel via UPS® or FedEx® is now based on the greater of the Dimensional Weight or actual weight of the parcel.

One obvious result of using Dimensional Weight to calculate shipping cost is that the shipping cost for parcels containing goods with lower densities and/or parcels with lower fill percentages will be greater when based on Dimensional Weight than on actual weight. While such a result may be problematic for many industry sectors, given the significant increase in parcel shipping resulting from ecommerce transactions, the use of Dimensional Weighing has resulted in a particularly large increase in ecommerce-related shipping costs. For example, approximately 75% of the total ecommerce shipments that occurred in 2016 were subject to about a 30% increase in shipping costs over 2015 due to the use of Dimensional Weighing. And given that ecommerce shipments are currently projected to increase by approximately 15% year-on-year for the foreseeable future, the concern over increased shipping costs is only bound to increase as well.

As a consequence of the widespread implementation of Dimensional Weighing and its possible adoption by other parcel carriers and/or by freight carriers, there is a heretofore unmet need for a mechanism by which a container (e.g., carton) of optimum dimensions may be identified or selected for shipping any given good or collection of goods while subject to Dimensional Weighing based-pricing. Exemplary system and method embodiments described herein meet said need.

SUMMARY

Exemplary embodiments described herein are directed to systems and methods for optimizing the size of cartons such that shipping costs resulting from Dimensional Weighing-based pricing will be minimized. Exemplary system and method embodiments may be used in small and large scale operations to analyze the mix of goods being shipped and to develop an optimized set of cartons of different dimensions that will most effectively accommodate various combinations of said goods at minimized Dimensional Weighing shipping costs. Exemplary system and method embodiments may include logic directed to reducing Dimensional Weighing shipping costs by, for example, minimizing the number of shipping cartons that will be subject to Dimensional Weighing-based pricing when loaded and by maximizing the utilization of available space within each carton.

While exemplary systems and methods are particularly useful in the field of one-carton express parcel shipping, said systems and methods may also be applicable to other forms of goods shipping, such as multi-carton parcel shipping, and LTL and/or FTL shipping where container space usage optimization would be beneficial.

Because of the volume and complexity of the calculations associated with exemplary carton optimization methods described herein, a related exemplary system is preferably computer-based, and may utilize a number of unique algorithms that receive or retrieve data from a number of databases. An exemplary system may be a standalone system in a given location or may be comprised of various components located in more than one location.

Generally speaking, an exemplary method uses four primary steps to reduce Dimensional Weighing shipping costs through carton optimization: (1) sampling, (2) order cubing, (3) pre-searching adjustment, and (4) optimal carton set searching. In a typical warehouse or other large volume shipping setting, sampling involves taking an order sample of an acceptable size from what is likely a large data set. The sample size may be determined using a statistics approach to ensure usable optimization results and to restrict the difference between the sample mean and the population mean within maximum error.

The order cubing step generally involves performing a multi-step and possibly iterative order cubing operation to determine a best fitted three dimensional carton for each sample order. Completion of all order cubing operations results in a set of optimally fitted cartons for all orders in the previously taken sample. The set of cubed carton data is subsequently used for searching out an optimal carton set having the lowest estimated shipping cost and highest space utilization rate.

The pre-searching adjustment step generally involves a narrowing down of the number of possible combinations of the three dimensional sample order cartons that would otherwise need to be searched during the optimal carton set searching process. More particularly, when the sample size is large, it would be time consuming and space inefficient to search for the optimal carton set out of all possible carton set combinations. Consequently, a problem-oriented adjustment step may be employed to reduce the number of combinations that must be considered—starting with $n_1$ cubed cartons and ending up with $n_{f2}$ feasible cartons that are actually used for searching.

The reduced number of feasible cartons resulting from the previous adjustment step serves as an input to the carton set searching step. Even after adjustment, however, the number of possible combinations to be searched is still very large and is an integer linear programming problem. Consequently, the carton set searching step preferably employs heuristic strategies, such as the use of a unique genetic algorithm that saves space and time, and is easily implemented.

During the optimal carton set searching step, objective functions may be used to minimize the total shipping cost of the carton set, and to maximize the total carton space utilization rate. Various constraints may be applied in order to calculate, for example, the void space when using a given carton to contain a given order, the shipping cost for each given order using a given carton, the void space percentage, the shipping cost and carton void space percentage of a given order by determining the most fitted carton from a given carton set, and the total shipping cost and total void space percentage for all orders.

Finally, the aforementioned unique genetic algorithm is applied to determine the optimized carton set for the given data. Given the feasible cubed carton sets determined from the previous steps and a current given carton set, the genetic algorithm may be used to determine an optimal carton set containing a certain number of cartons after a certain number of generations, as given any order in the sample there exists at least one carton having an optimal fit therewith. The determined optimal carton set will not only fit all orders in the sample, but the use thereof will also result in less shipping costs in comparison to use of the original (non-optimized) carton set.

Actions such as "optimal" carton set searching and determining the "optimized" carton set are disclosed above, and further described below. It should be realized, however, that mathematically, optimal cartons cannot be guaranteed. Therefore, as used herein, the term "optimum" and variations thereof such as but not limited to "optimal" and "optimize," refer to maximizing the chances of an optimal carton, not guaranteeing that an optimal carton is actually achieved.

Other aspects and features of the inventive concept will become apparent to those skilled in the art upon review of the following detailed description of exemplary embodiments along with the accompanying drawing figures.

BRIEF DESCRIPTION OF THE DRAWINGS

In the following descriptions of the drawings and exemplary embodiments, like reference numerals across the several views refer to identical or equivalent features, and:

FIG. 1 illustrates the problem associated with carton space underutilization in the context of Dimensional Weighing-based shipping costs;

FIG. 5 is a table showing the various dimensions of the eleven exemplary boxes of FIG. 4;

FIG. 10 further demonstrates additional steps of the exemplary order cubing operation according to an exemplary carton optimization method;

FIG. 18 is a table of carton optimization data that demonstrates one example of shipping cost savings that may be achieved by using an exemplary system and method to optimize carton size.

DETAILED DESCRIPTION OF THE EXEMPLARY EMBODIMENTS

Figure 2:
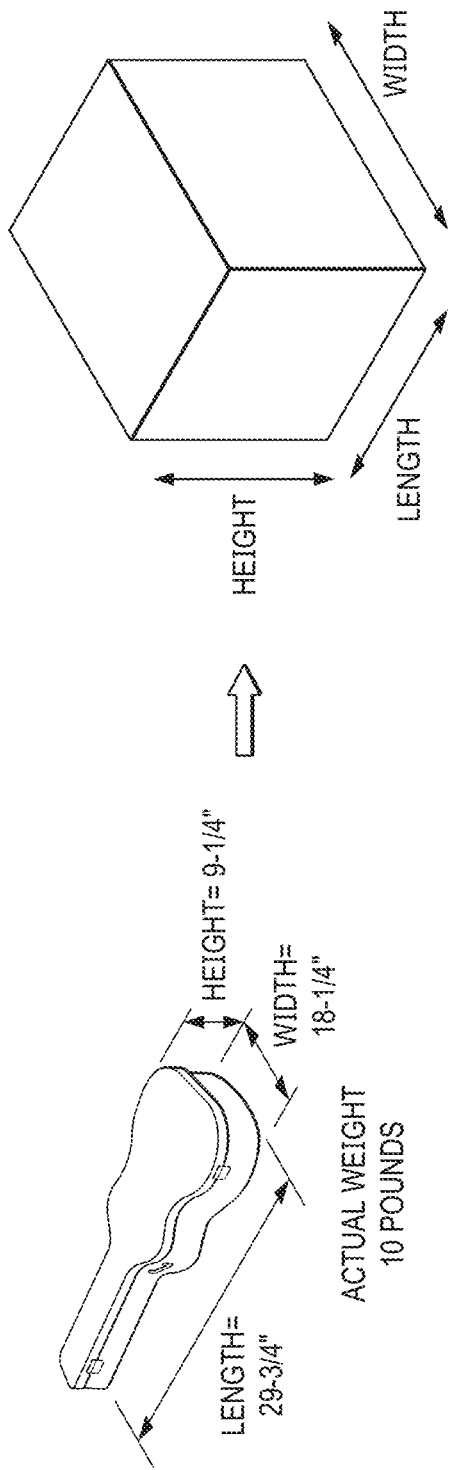
FIG. 2 similarly illustrates the problem associated with carton space underutilization in the context of Dimensional Weighing-based shipping costs.

FIG. 1 presents a graphic example of how shipping cost for the same item can increase under Dimensional Weighing-based pricing due only to an increase in shipping carton size. FIG. 2 also presents a graphic example of how shipping cost for the same item can increase under Dimensional Weighing-based pricing due only to an increase in shipping carton size. However, because the item being shipped in the example of FIG. 2 is much larger than the item being shipped in the example of FIG. 1, the Dimensional Weighing-based shipping cost for the item in the example of FIG. 2 increases more dramatically for each like increase in shipping carton size.

Exemplary system and method embodiments described below may be used in small and large scale shipping (and other) operations to analyze the mix of goods being shipped and to develop a set of cartons of different dimensions that will most effectively accommodate various combinations of said goods at minimized Dimensional Weighing shipping costs. Exemplary system and method embodiments may include logic directed to not only to reducing Dimensional Weighing shipping costs, but also to minimizing the number of shipping cartons that will be subject to Dimensional Weighing-based pricing when loaded and to maximizing the utilization of available space within each carton.

Because of the volume and complexity of the calculations associated with exemplary carton optimization methods described herein, a related exemplary system is preferably processor-based (i.e., computer-based), and may receive or retrieve data from a number of databases. An exemplary system may be a standalone system in a given location or may be comprised of various components located in more than one location.

An exemplary system includes complimentary programming having one or more specialized algorithms directing to each of an order cubing function, an adjustment function, and a carton set searching function (all of which are described in more detail below). The programming receives input in the form of goods order sample data associated with the location for which carton optimization is being performed. This input data is used by the system to perform the cubing, adjustment, and carton set searching functions, which will result in the identification of a set of cartons of optimized dimensions that will facilitate improved carton fill percentages and permit the various combinations of goods shipped from the location to be shipped with minimized Dimensional Weighing-based shipping costs.

An exemplary shipping carton optimization system may include a processing unit such as, for example, a PC/server with preferably 8 GB RAM and 2 GHz Processor. An exemplary system should also include Microsoft Excel in Developer mode (or an equivalent) on the processing unit. An exemplary system considers aspects/conditions, etc., such as, without limitation, current carton sizes, current shipment costs, etc. An exemplary system also considers other aspects/conditions, etc., such as physical constraints (e.g., the need for extra protection, relative weight of items/SKUs being packaged), the ease of procuring manufacturing for different carton sizes, etc.

An exemplary system will output a recommended exact number of cartons, along with the respective dimensions of said cartons and the potential cost savings that is achievable by utilizing the recommended cartons. This output includes a determination of the carton sizes in the current carton set that are no longer needed. The no longer needed cartons are then replaced with the new carton sizes recommended by the system.

The outputted recommendations of the system may also lead to configurational changes within the Warehouse Management System ("WMS") of the associated site, with which a shipping carton optimization system may communicate. These changes may include, without limitation, setting up new carton sizes in the WMS. Based on results output by the system, a number/percent of orders that will use each carton size will be predicted and thereby used to order relevant quantities of carton/corrugate boxes at the site of interest. As a result of the system output, the quantities of carton and corrugated material at the site are modified and optimized for use in shipping products therefrom.

Figure 3:
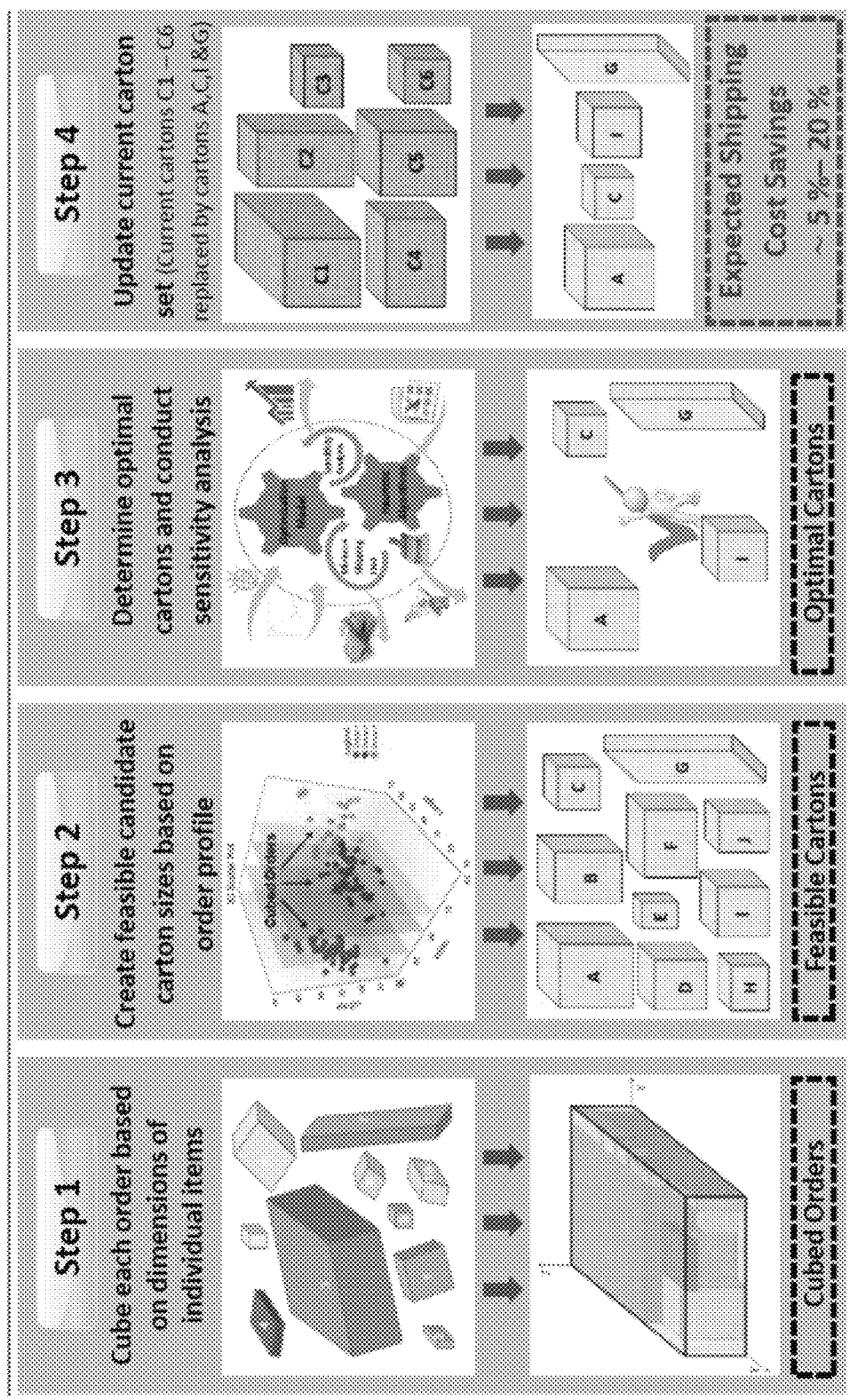
FIG. 3 graphically represents various steps of an exemplary shipping carton optimization method according to the inventive concept.

As graphically represented in FIG. 3, exemplary carton optimization methods may be described as generally comprising four primary steps—although a number of functions/actions may be encompassed within a given primary step, and an exemplary method may also include secondary steps. The four primary steps to carton optimization according to the general inventive concept include: (1) order sampling, (2) order cubing, (3) pre-optimization searching adjustment, and (4) optimal carton set searching.

In a typical warehouse or other setting associated with the shipping of a number of different possible goods in a multitude of different combinations, sampling essentially involves taking an order sample of some size from a typically large raw data set comprised of previous orders received at the location.

The size of a sample is preferably selected to guarantee 95% confidence in representing the total order population and may be based on the equation:

$$n = \frac{4}{W^2}$$

where W is in the range of sample values (e.g., within 1% of population carton utilization). In a higher volume shipping setting, it has been found that a sample size of between 5,000 and 10,000 orders (i.e., $5,000 \leq n \leq 10,000$) should be large enough to guarantee optimal accuracy and efficiency of the carton optimization process. In one exemplary warehouse experiment, the sample was comprised of 10,000 random selected independent orders that had been received at that location.

To restrict the difference between the sample mean and the population mean within maximum error E, the sample size $n_1$ may be determined using a statistical approach. For example, if it is assumed that all orders are normal independent variables, then the sample size $n_1$ may be calculated from the following equation:

$$n_1 = \left[\frac{\frac{Z_\alpha}{2} \times \sigma}{E}\right]^2$$

where E is the maximum error, $\sigma$ is the standard deviation, Z is the critical cutoff value, resulting in a $1-\alpha$ confidence level that the sample mean will fall within the maximum error E around the population mean.

Once an order sample has been obtained, order cubing is performed to improve the space utilization for each order. That is, an order cubing operation is used to determine a best fitted carton for each sample order. In an ecommerce shipping scenario, large orders requiring more than one carton for shipment are trivial in number in comparison to those orders that can be shipped in one carton. Consequently, an assumption is made that all orders in a given sample will fit in at least one carton of an optimized final carton set. Also, for each item in any given order, the longest item dimension is assumed to be the length, the second longest item dimension is assumed to be the width, and the shortest item dimension is assumed to be the height.

In one exemplary embodiment, the Modified Large Area Fits First (MLAFF) method is used for the order cubing procedure. However, because it is realized that use of the MLAFF algorithm may produce suboptimal results in cases where a given order contains more than one item with the same dimensions, a secondary pre-order cubing adjustment operation may first be undertaken. In the pre-order cubing adjustment operation, all items of identical or substantially identical dimensions in a given order are combined into a single item.

A specialized algorithm for performing a pre-order cubing adjustment operation of an exemplary carton optimization method has been developed. The primary strategy of the pre-order cubing adjustment algorithm is to replace an old order containing items of identical or substantially identical dimensions with a newly created order where all items of identical or substantially identical dimensions are combined into single items.

An exemplary pre-order cubing adjustment operation may be carried out as set forth below:

```
Procedure Items-Reducing(Order_Set)
inputs: Order_Set,a set containing all orders,          (1)
and each order is a set with all items
for each Order k in Order_Set                           (2)
  new_order← empty Set                                  (3)
  Key ←{length,width,height}                            (4)
  for each item i in Order k                            (5)
    if new_order contains i,                            (6)
      Increase the value of h_j                         (7)
      Increase the value of wt_j                        (8)
      REORDER ( hi,wi,li )                              (9)
      Key is reserved, even if the dimension has        (10)
      been changed
    else then, add i into new_order                     (11)
  Replace order k with new_order in                     (12)
  order_set
```

The new order is a set of items, and the length, width and height of each item in the set is used as a key for each item—where it is assumed that length is the largest dimension, height is the smallest dimension, and width is the in-between dimension. Consequently, the "if statement" in lines (6-10) of the algorithm functions to check whether an item with the same dimensions as a given key is already present in the new order. If an item with the same dimensions is not already present in the new order, the algorithm places the item into the current new order set (see line 11). If an item with the same dimensions as a given key is already present in the new order, the algorithm combines the two items into one item by appropriately increasing the value of the smallest dimension of the items. In either event, the item key is retained with its original length, width and height dimensions. After the reduction of dimensionally like items is complete, the algorithm replaces the original order with new order, and the set of orders is updated.

In cases where reordering is undertaken, once all reordering by the pre-cubing adjustment algorithm is complete, the order cubing operation of an exemplary carton optimization method may be performed. As previously mentioned, the order cubing operation results in a set of optimal fitted cartons for all orders in the previously taken sample, and the set of cubed carton data is subsequently used for searching out an optimal carton set having the lowest estimated shipping cost and highest space utilization rate. An exemplary order cubing operation is generally graphically represented in FIGS. 4-14.

As also previously mentioned, exemplary method embodiments may employ a MLAFF algorithm in the order cubing operation. Various variables and parameters of a MLAFF minimum height algorithm are shown below:

| | |
|---|---|
| k | Sample Order Index |
| S | Space parameter |
| i | Item Index |
| ik | Item i in Order k |
| li | Length of Item i |
| wi | Width of Item i |
| hi | Height of Item i |
| wti | Weight of Item i |
| vi | Dimensional Weight of Item i |
| Ck | The cubed carton for order k |
| wtk | The weight of cubed carton for order k |
| lk | The length of cubed carton for order k |
| wk | The width of cubed carton for order k |
| hk | The height of cubed carton for order k |
| dwk | The dimensional weight of cubed carton for order k |
| Sp | The set of given previous cartons |
| Sc | The set of cubed cartons |

The MLAFF algorithm employed herein is modified to encourage carton space utilization when selecting/creating new cubed cartons for sample orders. The MLAFF algorithm makes use of the set of sample orders and implements a good cubing for each order, with the result being the selection/creation of a cubed carton for each given order. An exemplary MLAFF algorithm according to an exemplary carton optimization method may operate as set forth below:

```
function Order_Cubing(Order_Set)
inputs: orders,a set containing all orders,after the adjustment of previous steps
for each order k in orders
  Initiate carton for order k,C_k
  dimList ←an empty list
  for each item i in Order k
    Add hi,wi into the dimlist
  Sort the dimlist by the descending magnitude
  Sort the items i in k by descending base_area ← MULTIPLY(wi,li)
  lk ←the first dimension in the dimList,wk ←the first dimension in the dimList
  while SIZE(k)>0
    i ←remove next item from orders
    put i on top of Ck,add hk by hi
    define a new layer space with dimension (lk,wk,hi)
    calculate the dimensions for the new x and y empty space for current layer
    add wti onto the wtk
    for each item i2 in Order k
      if i2 fits into y space
        Update y space and x space dimensions
        Check Top space_Side space_Space (k,i2,y)
        remove i2 from orders
        add wti2 onto wtk
      else if i2 fits into x space
        Update y space and x space dimensions
        Check Top space_Side_Space (k,i2,x)
        remove i2 from orders
        add wti2 onto wtk
    Shrink dimensions of Ck
    add Ck into Sc
  return cubed carton set sc
```

During an exemplary order cubing operation, the lengths and widths of all items in a given order being cubed are initially placed into a list. The resulting list of dimensions is then sorted, as the length and width dimensions of the selected carton are determined by the largest and second largest dimension on the item dimension list. The length and width of each item are also multiplied to determine an area, and the items in the order are preferably arranged beginning with the item of largest determined area.

Figure 4:
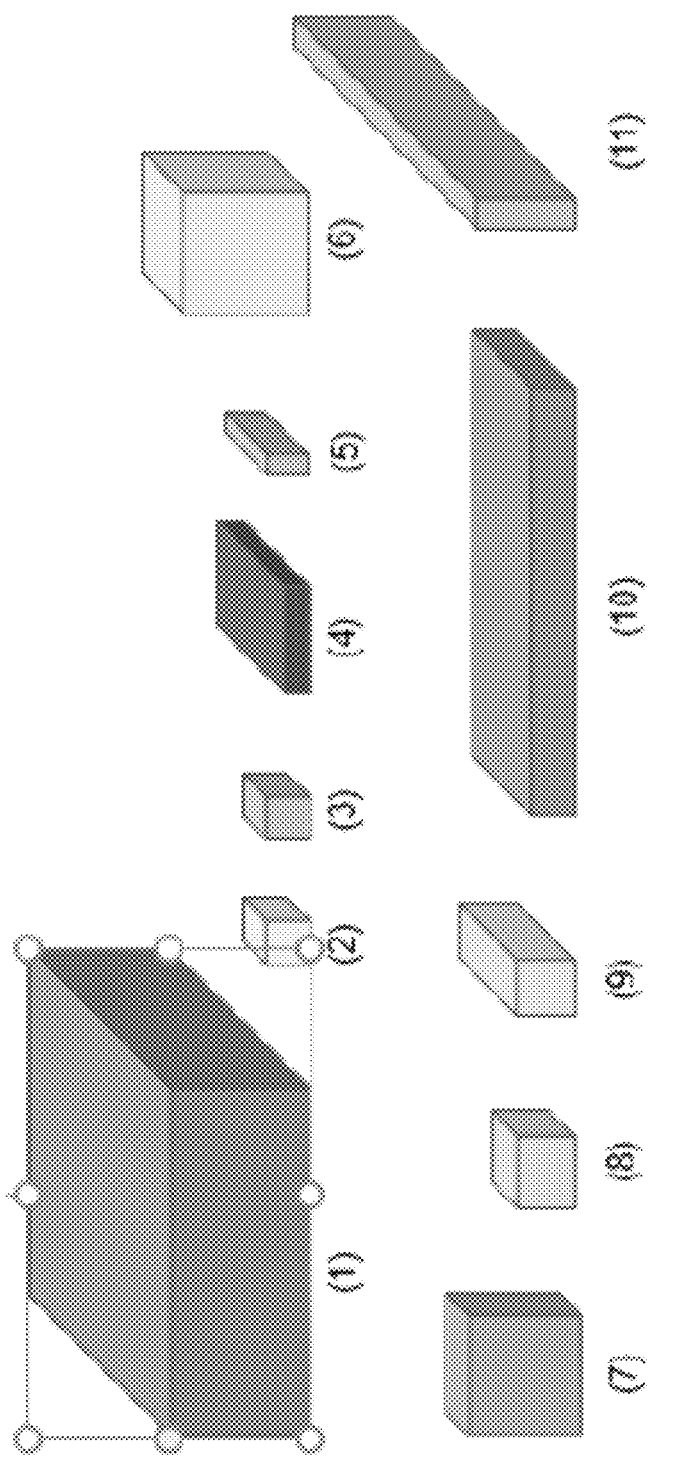
FIG. 4 is a graphic representation of eleven different exemplary boxes used to demonstrate an exemplary order cubing operation of an exemplary shipping carton optimization method.

An exemplary set of order items (boxes in this example) of an exemplary order are represented in FIG. 4, with the length, width, and height dimensions for each of said boxes listed in the table of FIG. 5.

Figure 6:
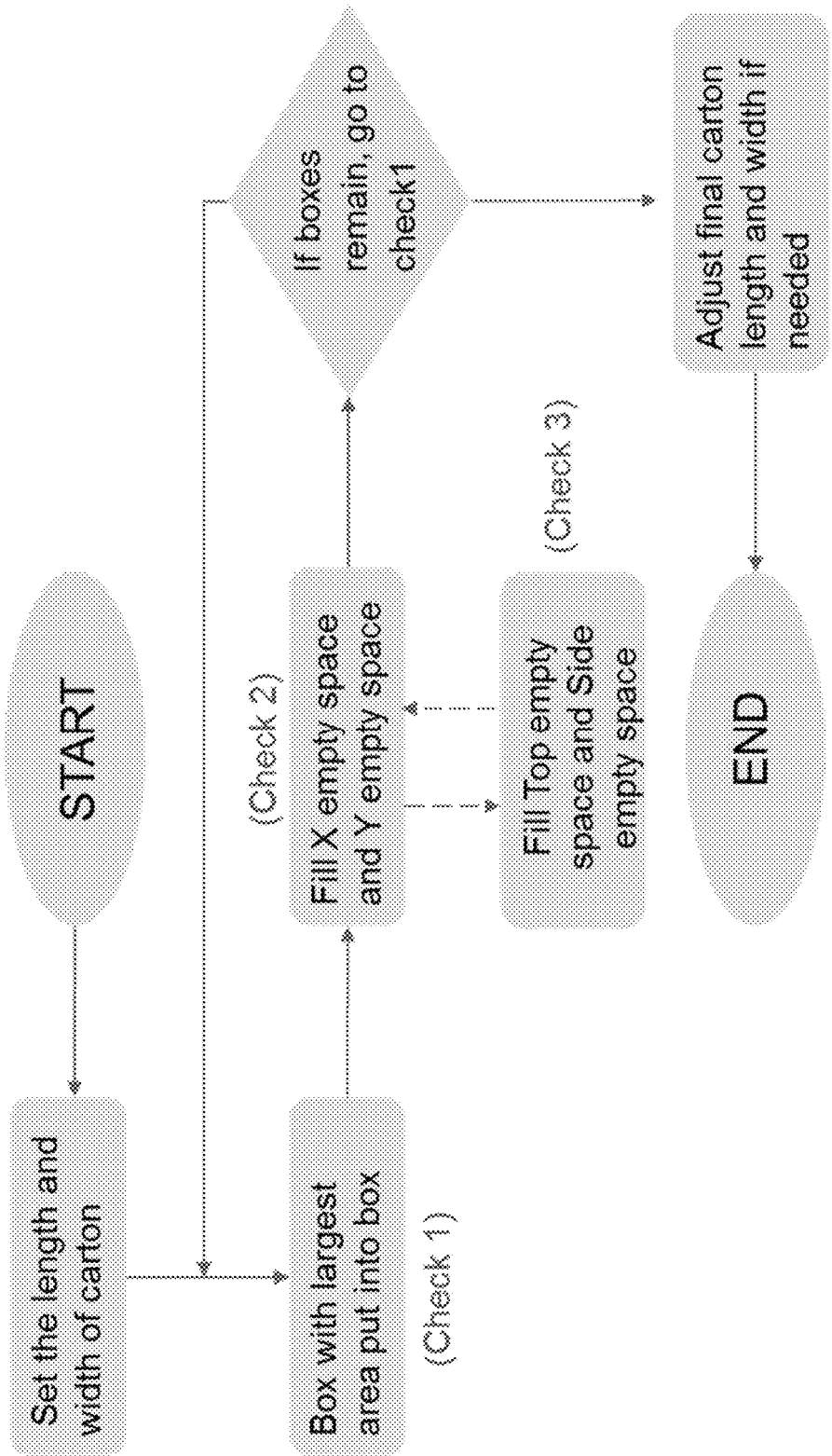
FIG. 6 is a flow diagram that illustrates generally the steps of an exemplary order cubing operation of an exemplary shipping carton optimization method.
Figure 7:
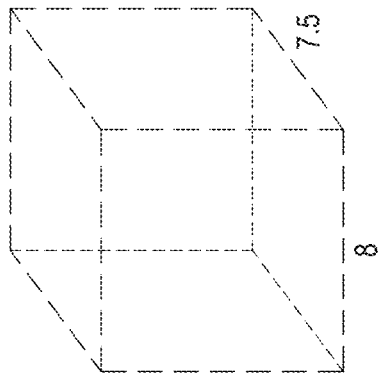
FIG. 7 demonstrates an initial step of an exemplary order cubing operation according to an exemplary carton optimization method.
Figure 8:
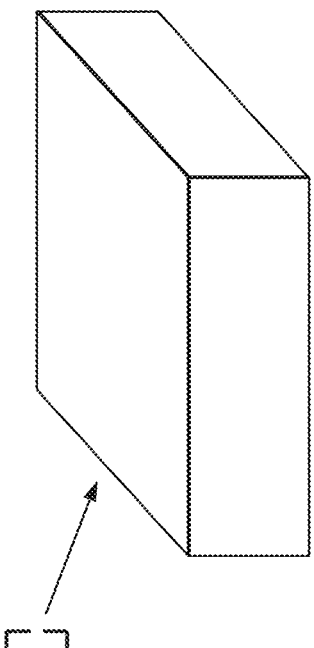
FIG. 8 further demonstrates additional steps of the exemplary order cubing operation according to an exemplary carton optimization method.

The basic logic of an exemplary order cubing operation is represented in the flow chart of FIG. 6. Further implementation of an exemplary cubing operation through use of the MLAFF algorithm is graphically represented in FIGS. 7-16. This process considers a virtual carton having first layer dimensions ($l_k$, wk, hi).

As shown in the context of cubing a single order for purposes of illustration, the first step in this exemplary cubing operation employing the MLAFF algorithm, is determining the longest two edges among all of the eleven boxes, and setting the virtual carton length and width equal to these dimensions. As a result, the virtual carton length is set to 8 inches and the width is set to 7.5 inches in this example. There is no limit for virtual carton height.

Figure 9:
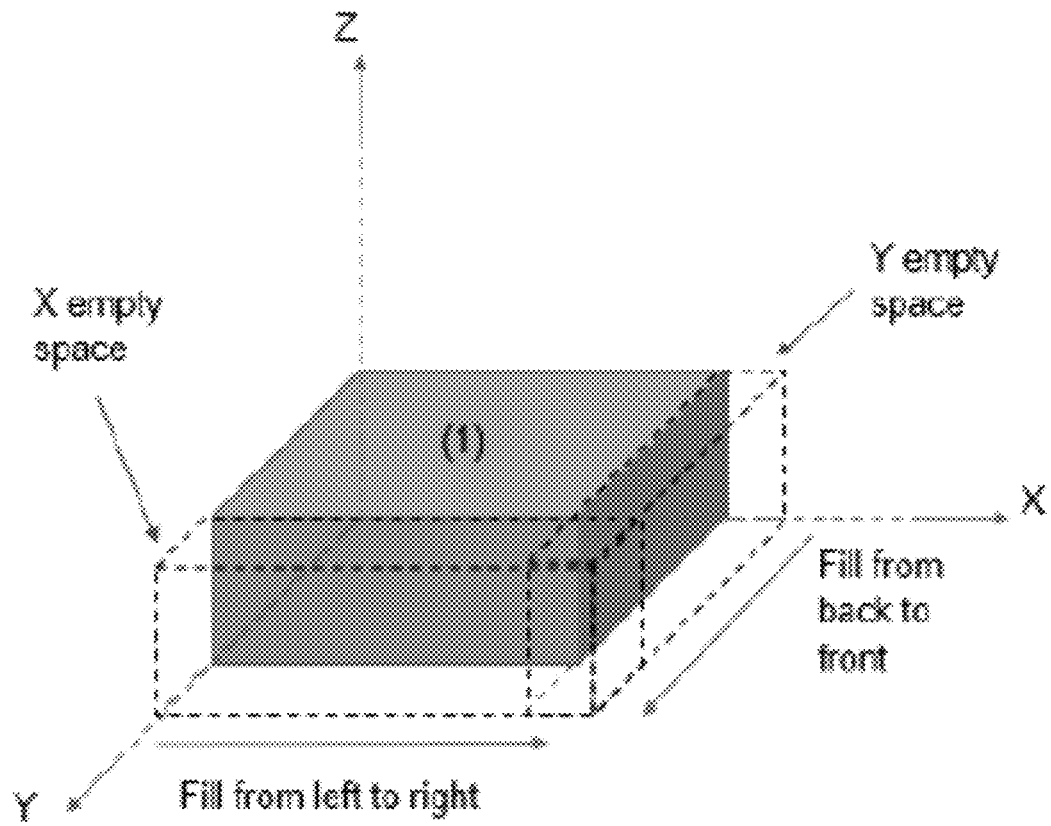
FIG. 9 further demonstrates additional steps of the exemplary order cubing operation according to an exemplary carton optimization method.

A first layer of items is then initially placed in the virtual carton of interest. The first box to be placed in the first layer will be the box from the group of items shown in FIG. 4 having the largest determined length times width area, as described above. In this case, the box with the largest length times width area is box 1, having an area of 35 square inches. Placement of box 1 into the virtual carton may be referred to as the Check 1 step and box 1 may be referred to as the Check 1 box. As shown in FIG. 9, the Check 1 box 1 is placed in the virtual carton with the box length parallel to the carton length and the box width parallel to the carton width.

As also shown in FIG. 9, placement of the Check 1 box 1 into the virtual carton as described above results in lateral void spaces between the carton side walls and the Check 1 box 1 in this example. The empty spaces are referred to herein as an X-empty space and a Y-empty space for simplicity. It can be seen that there is an area of overlap between the X-empty space and the Y-empty space.

Figure 11:
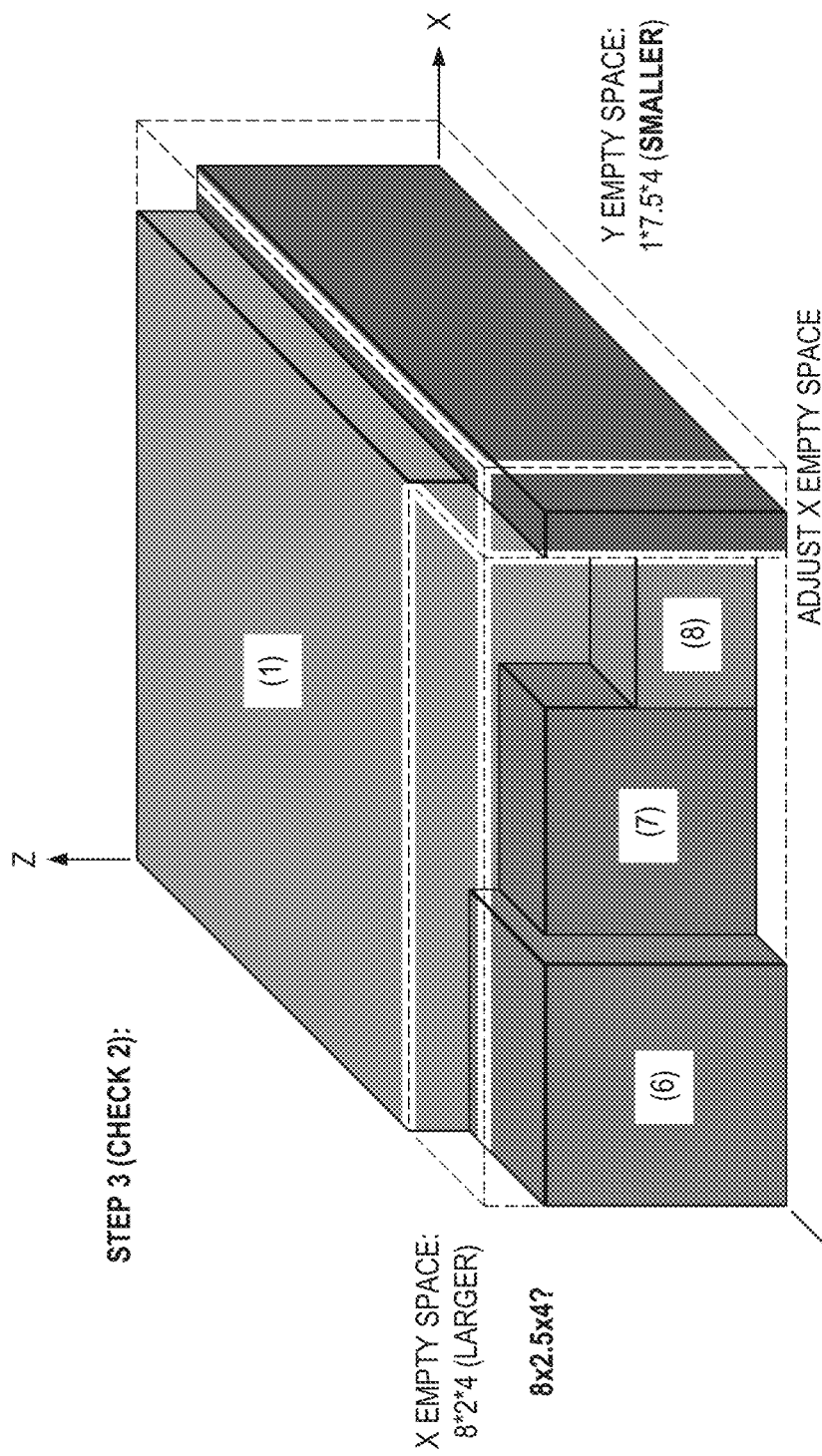
FIG. 11 further demonstrates additional steps of the exemplary order cubing operation according to an exemplary carton optimization method.

As represented in FIG. 11, the X-empty space and the Y-empty space are subsequently filled to the extent possible with remaining ones of the eleven exemplary order boxes, as well as any unboxed items, represented in FIGS. 4-5. The boxes or unboxed items used to fill the X-empty space and the Y-empty space are preferably selected on a largest-to-smallest volume basis (see FIG. 10).

Filling the smaller of the empty spaces first is preferred, as fitting the biggest of the remaining order boxes into the smallest space will generally result in better carton space utilization. Thus, if the Y-empty space is smaller than the X-empty space (as is the case in this example), the Y-empty space is preferably filled before the X-empty space is filled. If the X-empty space is smaller than the Y-empty space, the filling process may be reversed.

If the Y-empty space is filled first, a check should be performed to determine if the dimensions of the X-empty space should be adjusted. If the X-empty space is filled first, a check should be performed to determine if the dimensions of the Y-empty space should be adjusted. The X-empty space is filled in a direction starting away from and moving toward the area of overlap between the X-empty space and the Y-empty space (i.e., left-to-right in this particular example). Similarly, the Y-empty space is filled in a direction starting away from and moving toward the area of overlap between the Y-empty space and the X-empty space (i.e., back-to-front in this particular example).

As indicated in FIG. 11, following the above virtual carton space-filling preferences results in the placement of boxes 6, 7, 11 and 8 into the X-empty space and the Y-empty space in this exemplary embodiment, with boxes 6, 7 and 8 located in the X-empty space and box 11 located in the Y-empty space. The step of filling the X-empty space and the Y-empty space may be referred to as the Check 2 step and the boxes 6, 7, 11 and 8 that are used to fill the X-empty space and the Y-empty space may be referred to as Check 2 boxes. Each time a box is placed into the X-empty space or the Y-empty space, the dimensions of the given space are updated. Boxes will preferably continue to be added to the X-empty space or the Y-empty of the first layer until there are no longer any boxes left that will fit into what remains of the X-empty space or the Y-empty space.

Figure 12:
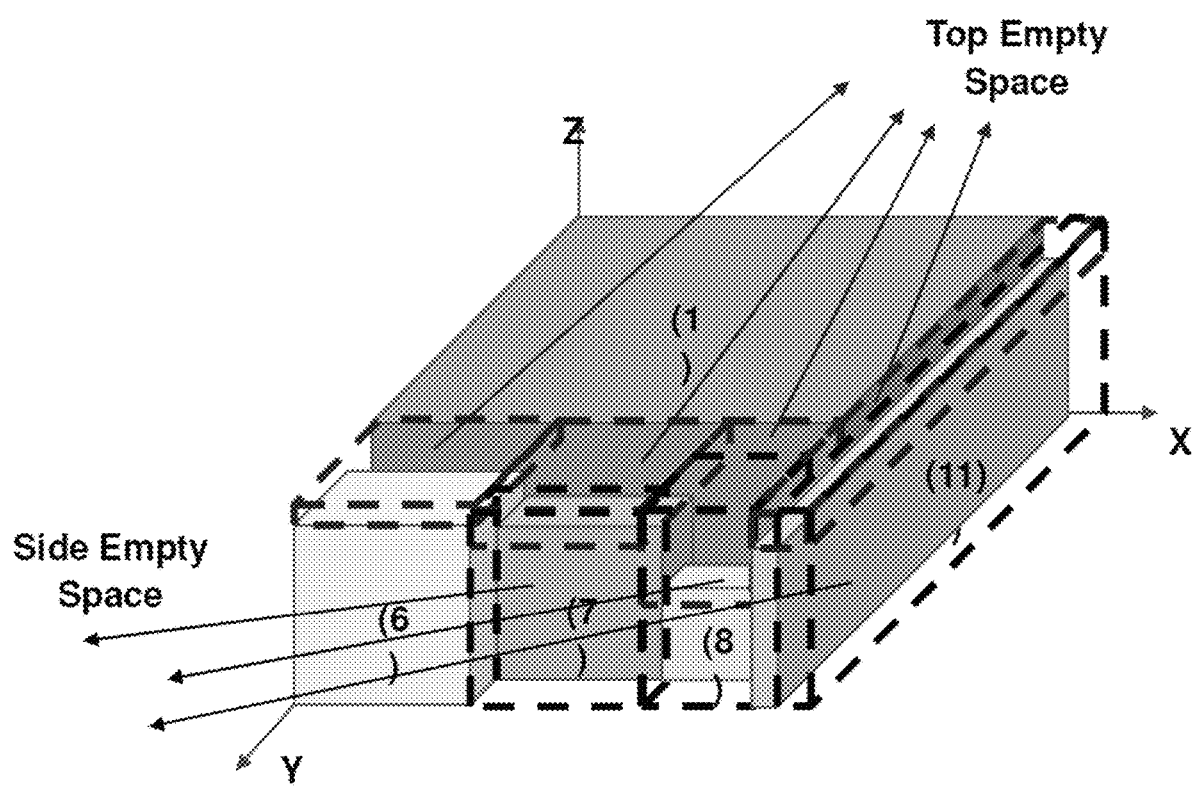
FIG. 12 further demonstrates additional steps of the exemplary order cubing operation according to an exemplary carton optimization method.

It may be observed in FIG. 12 that respective placement of the Check 2 boxes 6, 7, 11 and 8 into the X-empty space and the Y-empty space results in additional empty horizontal and vertical spaces, which may be referred to as Top-empty spaces and Side-empty spaces for simplicity. The Top-empty space is defined as the horizontal empty space resulting from the difference between the height of the first layer (as determined by the height of the Check 1 box 1) and the vertical dimensions of the Check 2 boxes 6, 7, 8, 11 that have been respectively placed in the X-empty space and the Y-empty space. The Side-empty space is defined as the vertical empty space resulting from the difference between the overall width of the virtual carton and the horizontal dimensions of the Check 1 box 1 and Check 2 boxes 6, 7, 8, 11 that have been respectively placed in the X-empty space and the Y-empty space.

An exemplary method of checking the Top-empty space and the Side-empty space may be carried out as follows:

```
function Order_Cubing(Order k,Item i,space s )
inputs: order k,a set contains items not in current carton
item i,the current item creates top and side space space s,current space creates top and
side space
Calculate the top and side space dimensions for current item in side spaces
for each item i₂ in Order k
    if i₂ fits into top space
    update top space and side space dimensions
    remove i₂ from orders
    add wt_{i2} onto wt_k
```

```
else if i₂ fits into side space
update top space and side space dimensions
remove i2 from orders
add wti2 onto wtk
```

The process of checking and subsequently attempting to fill the Top-empty space and Side-empty space of other than the first layer is substantially similar to that of checking and subsequently attempting to fill the X-empty space and Y-empty space of the first layer. That is, all of the remaining order items are analyzed based on dimensions fitted into the Top-empty space or Side-empty space when possible. As with the process of filling the X-empty space and Y-empty space, the dimensions of the Top-empty space and Side-empty space are updated each time an item is added thereto.

Checking the Top-empty space and the Side-empty space, and filling either or both spaces with order items when possible, can improve the carton space utilization rate. It should be understood, however, that in some cases the amount of Top-empty space and Side-empty space may be so minimal as to be unusable. Thus, in some cases, the step of checking for Top-empty space and Side-empty space may be omitted from the cubing operation.

Since box 10 still remains even after iteratively performing the Check 1 and Check 2 steps of the exemplary cubing algorithm, because it will not fit into either the X-empty space or the Y-empty space of the first layer (the height of which is defined by the top face of the first box 1), a new layer is created on top of the first layer and the Check 1 and Check 2 steps are performed again.

Figure 13A:
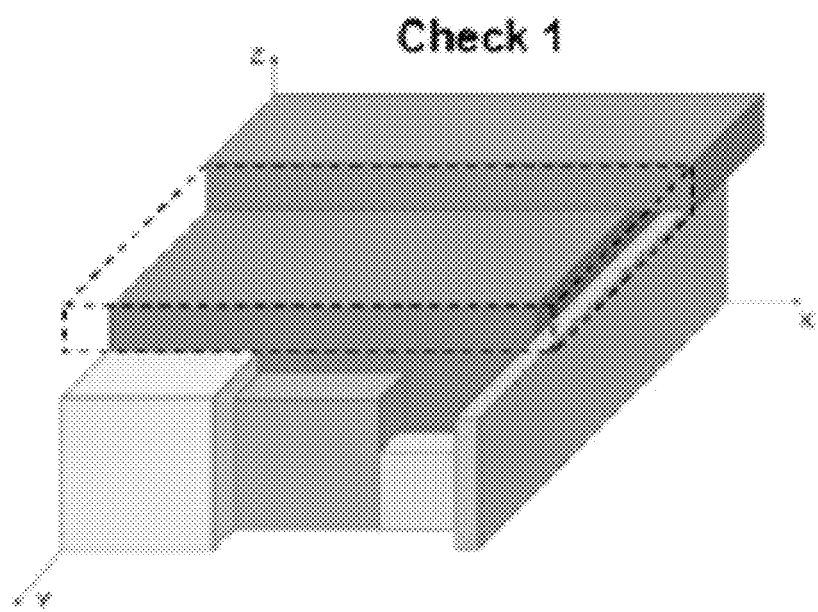
FIGS. 13A-13B further demonstrate additional steps of the exemplary order cubing operation according to an exemplary carton optimization method.

Performing the Check 1 step relative to the second layer results in initial placement of the box 10 on top of the Check 1 box 1, with the length (8 inches) of the box 11 oriented parallel to the length (8 inches) of the virtual carton, as illustrated in FIG. 13A. As the length of the box 10 spans the entire length of the virtual carton, only a single void space remains in the second layer (versus the X-empty space and the Y-empty space of the first layer).

The void space of the second layer is subsequently filled in the same manner described above with respect to filling the first layer. That is, the Check 1 and check 2 steps of the cubing algorithm are again iteratively applied in an attempt to fill the void space of the second layer with the remaining ones of the eleven boxes 2, 3, 4, 5 and 9 of FIGS. 4-5, in order of largest-to-smallest volume. This results in the box placement shown in FIG. 13B, where the boxes have been placed on top of the Check 1 box 1 in the box order 4-9-2-3-5.

The Check 1 and Check 2 steps of an exemplary order cubing operation may be looped (i.e., iteratively applied) as long as there are order items remaining and space left on a given layer of the virtual carton being cubed. Consequently, there is no specific limit on the number of layers that may be created. Ultimately, the cubing algorithm will determine a cubed carton size in which all of the items of a given order can be placed, and will output relevant information about said carton. The width and length of the carton may also be resized, if possible. Implementing such a cubing algorithm for all orders in a given sample, results in a cubed carton set.

Figure 13B:
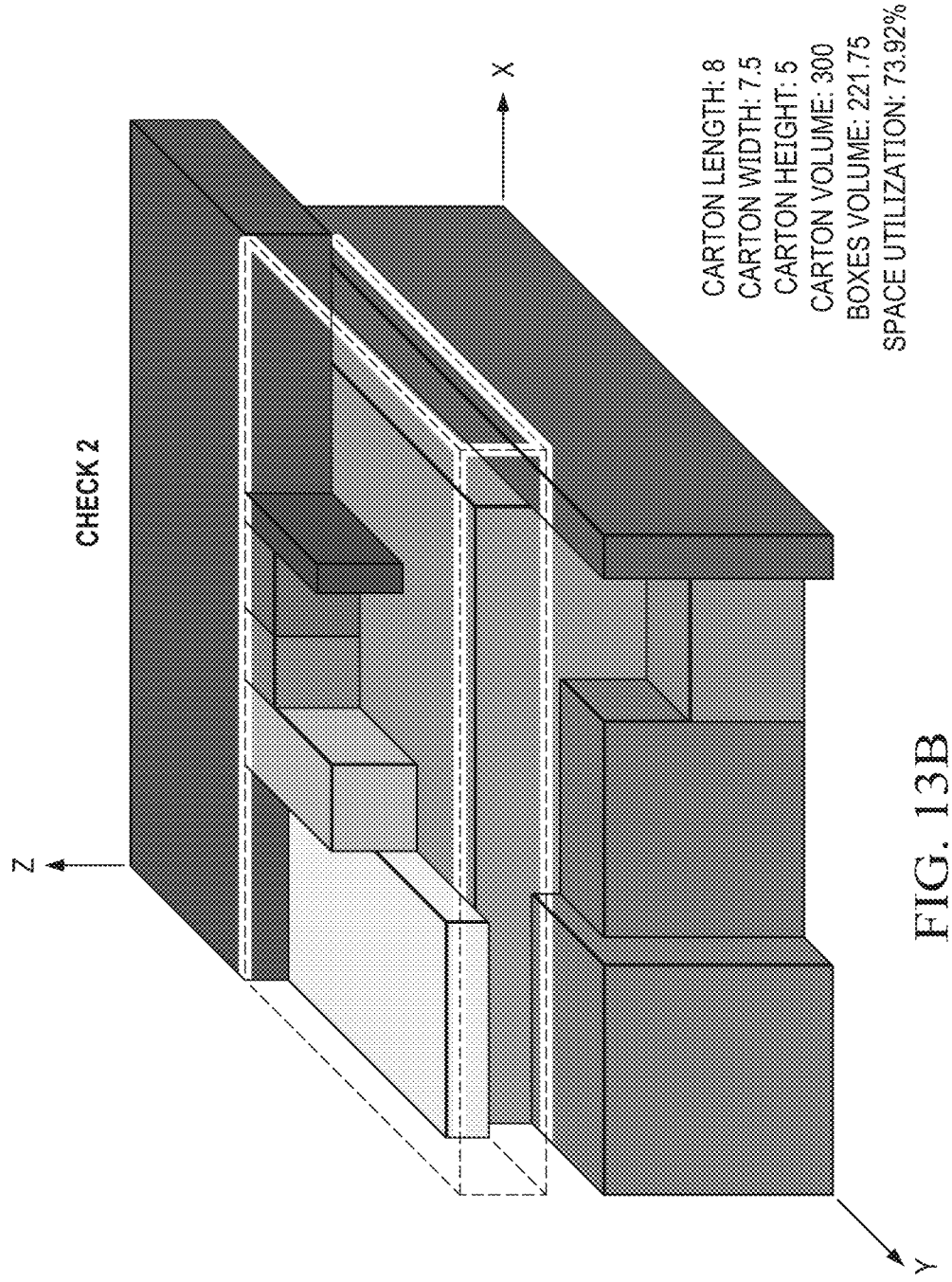

The cubing algorithm output for the exemplary box order of FIGS. 4-5 is also represented in FIG. 13B. Particularly, the cubing algorithm has determined that a carton having a length of 8 inches, a width of 7.5 inches, a height of 5 inches and a resulting volume of 300 cubic inches, is the optimal carton size for shipping the exemplary eleven boxes shown in FIG. 4 with a minimized Dimensional Weighing cost. As may also be observed in FIG. 13B, the carton space utilization percentage in this example given a carton volume of 300 cubic inches and a total volume of the eleven exemplary boxes of 221.75 cubic inches is 73.92%.

Figure 14:
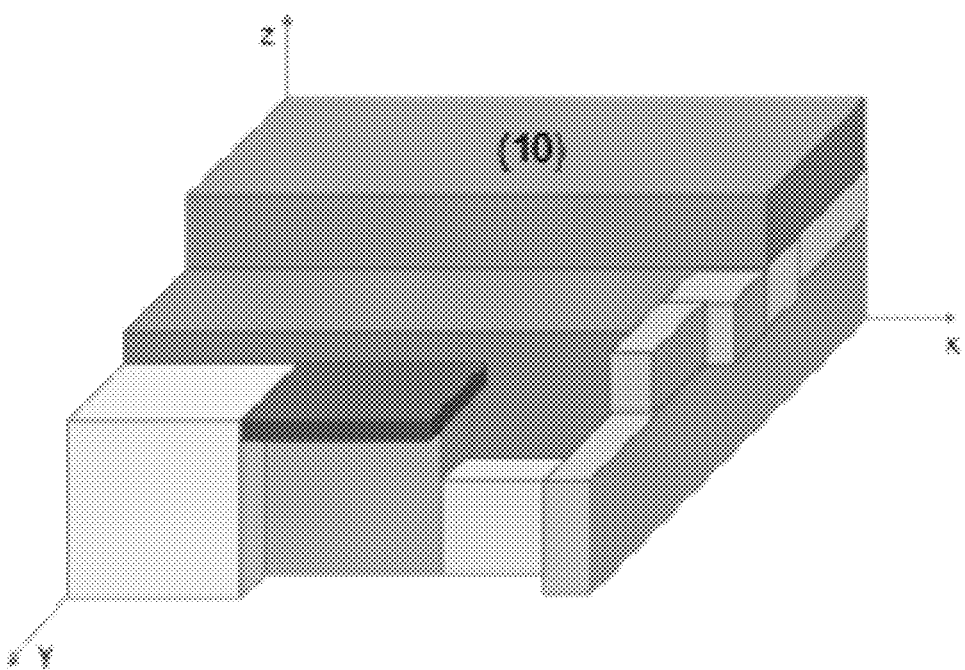
FIG. 14 represents an alternate item arrangement resulting from a variation of exemplary order cubing operation according to an exemplary carton optimization method.

FIG. 14 graphically illustrates the result of a further refinement of an exemplary order cubing operation of an exemplary carton optimization method, which may lead to additional improvement in carton space utilization percentage. Particularly, when the Check 1 and Check 2 steps of the order cubing algorithm are unable to fill the Top-empty and Side-empty spaces depicted in FIG. 12, a third (Check 3) step may be performed after the addition of each box to the virtual carton during the Check 2 step. Thus, as with the Check 1 and Check 2 steps, the Check 3 step may be looped in an exemplary order cubing operation.

As can be understood from FIG. 14, the result of employing a Check 3 step in this particular example does not result in a change in the calculated optimal carton size nor an improvement in the carton space utilization percentage. However, as may be observed by comparing FIG. 14 to FIG. 13B, use of the additional Check 3 step does result in an arrangement of boxes within the virtual carton that is different than the arrangement resulting from the operation of the order cubing algorithm where only the Check 1 and Check 2 steps are performed.

Figures 15A, 15B:
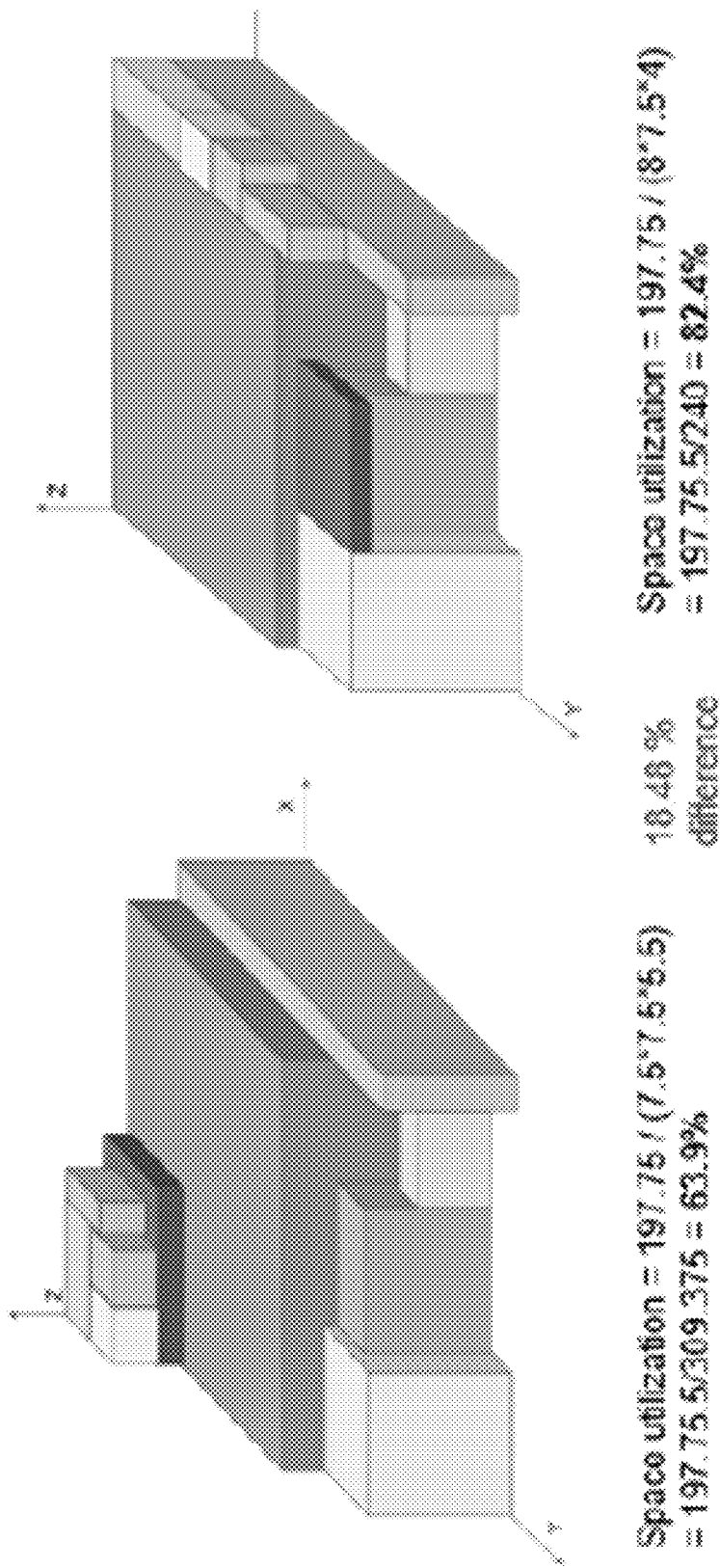
FIGS. 15A-15B demonstrate a possible further refinement of an exemplary order cubing operation according to an exemplary carton optimization method.
Figure 16:
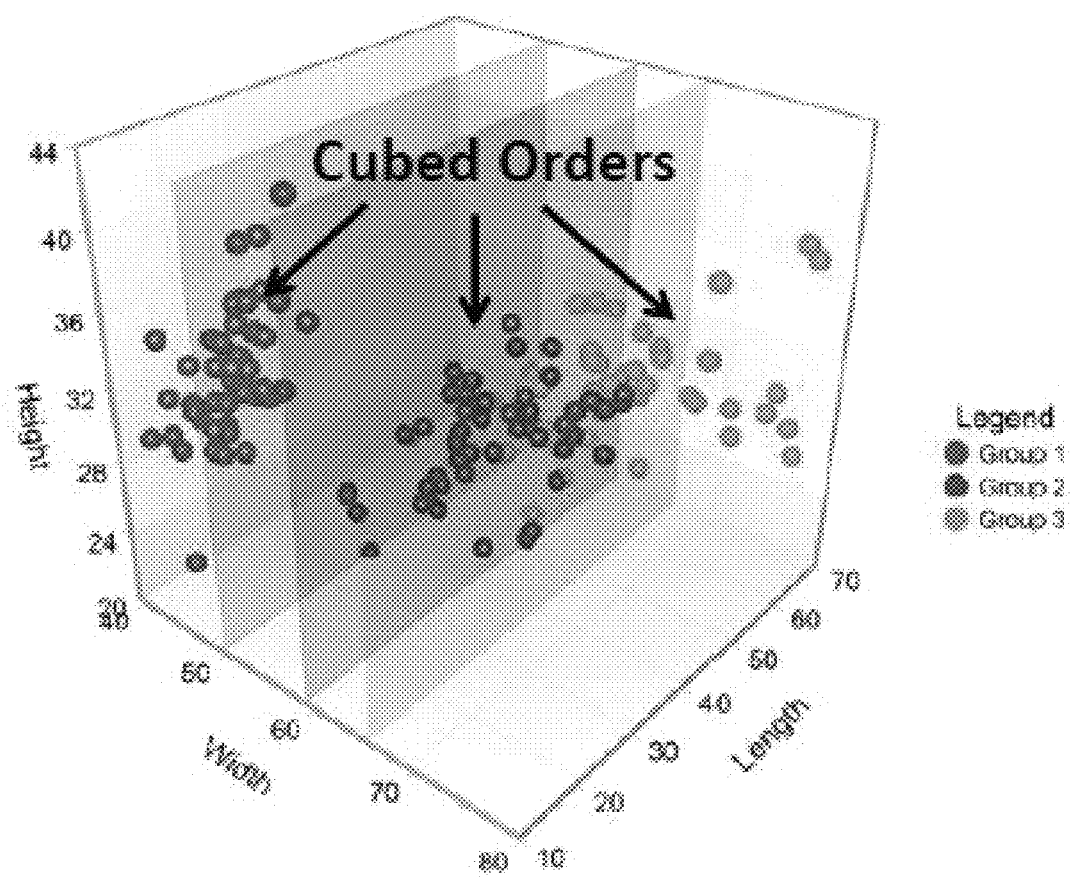
FIG. 16 is a 3D scatter plot graph showing an exemplary clustering of cubed orders.

An example where using the order cubing algorithm to perform a Check 3 step does reduce the calculated optimal carton size and improve the carton space utilization percentage is represented in FIGS. 15A-15B. This example again uses all of the exemplary boxes of FIGS. 4-5 except for the box 10, which is omitted. As a result, the total box volume that must be fit into an optimized carton is reduced from 221.75 cubic inches to 197.75 cubic inches in this example.

FIG. 15A represents the box arrangement and optimized carton size that results from performing the order cubing operation without the Check 3 step (i.e., only the Check 1 step and Check 2 steps are used). As shown, the required carton dimensions are calculated to be 7.5 inches in length, 7.5 inches in width, and 5.5 inches in height, for a carton volume 309.375 cubic inches. Given a total box volume of 197.75 cubic inches, the resultant carton space utilization percentage in this example is 63.9%.

In contrast, FIG. 15B represents the box arrangement and optimized carton size that results from performing the order cubing operation with the Check 3 step included. As shown, the required carton dimensions are calculated to be 8 inches in length, 7.5 inches in width, and 4 inches in height, for a carton volume 240 cubic inches—a 69.375 cubic inch reduction over the calculated carton volume in the example of FIG. 15A. Given again the total box volume of 197.75, the resultant carton space utilization percentage in this example improves to 82.4%.

While the above-described examples demonstrate application of the specialized order cubing algorithm to one exemplary order of a larger order sample set, it should be understood by one of skill in the art that an order cubing operation is performed on every sample order in the set.

Consequently, completion of all order cubing operations results in a set of optimal fitted cartons for all orders in the previously taken sample.

Once a set of optimal fitted cartons for all orders in the given order sample has been generated using the aforementioned order cubing algorithm, an exemplary carton optimization method may be further used to determine and output an optimal carton set having cartons into which can fit any one of the sample orders, while also providing for the lowest estimated Dimensional Weight shipping cost and highest estimated carton space utilization percentage.

When the order sample size is large, it is preferable to perform an adjustment function prior to determining an optimal carton set because it would be time consuming and space inefficient to search for the optimal carton set out of all possible carton set combinations. For example, a carton set searching process directed to finding 10 optimal cubed cartons out of 1,000 selectable cubed cartons would result in $2.6340956e^{+23}$ possibilities to consider.

An exemplary pre-searching adjustment function, therefore, generally involves a narrowing down of the number of possible combinations that would otherwise need to be searched during the optimal carton set searching process. The pre-searching adjustment function is a problem-oriented function that reduces the number of combinations that must be considered—starting with $n_1$ cubed cartons and ending up with $n_{f2}$ feasible cartons that are used for searching, where $n_1 \geq n_{f2}$.

Various parameters of an exemplary pre-searching adjustment function may include:

| | |
|---|---|
| ck | The cubed carton for order k |
| cpk | The current using carton for order k |
| cb | The pseudo big carton |
| wtk | The weight of cubed carton for order k |
| lk | The length of cubed carton for order k |
| wk | The width of cubed carton for order k |
| hk | The height of cubed carton for order k |
| lpk | The length of current using carton for order k |
| wpk | The width of current using carton for order k |
| hpk | The height of current using carton for order k |
| dwk | The dimensional weight of cubed carton for order k |
| rdw | The ratio between the volume and dimensional weight. |
| Sp | The set of given previous cartons |
| lc | The list of all cubed cartons |
| Sf | The finalized cubed carton set |
| Sfcs | The final feasible |
| n1 | Number of cubed cartons |
| nf1 | Number of cubed cartons after adjustment |
| nf2 | Final number of cartons. |

There are two different cases to consider relative to performing an exemplary pre-searching adjustment function. In the first case, it is assumed that parameter Sp, which is the set of given previous (i.e., currently used) cartons is provided, as is information about the set of given previous cartons. In the second case, it is assumed that there is no set of given previous cartons (i.e., the to-be-determined optimal carton set will be the first carton set associated with a given order set). If Sp is not provided, then it will be required to generate an optimal carton set from scratch, and it is unnecessary to perform a pre-searching adjustment step. If Sp is known, then running a pre-searching adjustment function is warranted.

An exemplary pre-searching adjustment function may be performed as follows:

```
procedure Adjustment (orders,S_c,S_p,)
for each order k in orders
  if (LENGTH(c_k)≥LENGTH(c_pk) AND
      WIDTH(c_k)≥WIDTH(c_pk) AND
      HEIGHT(c_k)≥HEIGTH(c_pk) )
    delete ck from Sc
```

If the set of given previous cartons is known/provided, then it can be determined which carton is currently used to ship each order k. If the carton currently being used to ship a given order has less volume than the cubed carton associated with that order as a result of the previously performed order cubing operation, the cubed carton is discarded from the set of cubed cartons Sc (Table 1).

It is of course desirable to ensure there will be at least one carton in the feasible set that can hold all orders in the sample. This can be accomplished by finding the maximum height, maximum width and maximum length for the cubed cartons of all orders and using the biggest of those dimensions as the pseudo big carton cb when determining an optimal carton set. This function may be expressed as:

$$DIM(cb)=(\text{Max}(lk),\text{Max}(wk),\text{Max}(hk)), \forall k \qquad (1)$$

With cb subsequently integrated into the cubed carton set Sc, the feasible carton set would include this carton.

In order to reduce the number of combinations that must be considered from n1 cubed cartons to nf2 feasible cartons, as described above, optimal fitted (cubed) cartons having similar dimensions (e.g., dimensions within some predefined tolerance zone) are preferably grouped into clusters (nf). The clusters may be customized by users. The most representative carton with the largest length, width and height dimensions is then determined for each cluster. The dimensional range may be calculated as follows:

$$Sg = n1 nf \qquad (2)$$

$$m = \text{Max}\{\text{Max}(lk)-\text{Min}(lk),\text{Max}(wk)-\text{Min}(Wk),\text{Max}(hk)-\text{Min}(hk)\}, S_g, \forall k \qquad (3)$$

The estimated number of possible cartons in a group is represented by equation (2) above. Cubed cartons having dimensions within the range m would be taken as a group, with m being the largest dimensional difference over an estimated cluster size. An exemplary clustering of cubed cartons is represented by the 3D scatter plot of FIG. 16.

The exemplary pre-searching adjustment step may be further performed as follows:

| | |
|---|---|
| function Adjustment ( L_c,S_p) | (4) |
| Sf ←empty list for storing feasible cartons | (5) |
| sort L_c by descending volume | (6) |
| while SIZE(orders)>0 | (7) |
| carton c←remove the first carton from L_c | (8) |
| add c into Sf | (9) |
| for each carton c2 in Sc | (10) |
| if( lc−lc2≤m and wc−wc2≤m and hc−hc2≤m) | (11) |
| delete c2 from Lc | (12) |
| return Sf | (13) |

Performing an exemplary pre-searching adjustment step results in the construction of a new finalized cubed carton set Sf, which includes all representative cartons in all clusters. The carton with largest length, width and height dimensions of the set is then taken to be the representative of the set, because the carton is all other orders in the same group are able to fit within the carton. If a given cubed carton is already in a group, it is removed from the list of all cubed cartons lc. Therefore, for any order in the given sample, at least one carton may be found in the finalized cubed carton set Sf that will fit that order.

A last step of the exemplary pre-searching adjustment step is to union the set of previous given cartons Sp, the finalized cubed carton set Sf, and the pseudo big carton cb. This results in a final feasible carton set Sfcs that includes all different cases for carton optimization and may be used during subsequent determination of an optimal carton set. The unioning step may be represented as follows:

$$\text{Feasibility Carton Set: } Sfcs = \cup\{Sf, Sp, \{cb\}\} \quad (14)$$

The reduced number feasible carton set Sfcs resulting from operation of the previous adjustment function serves as an input to the optimal carton set searching operation. Even after adjustment, however, the number of possible combinations to be searched (i.e., (npk)=np!(np−k)!k! candidate solutions) is still very large and is an integer linear programming problem. Consequently, the carton set searching step preferably employs heuristic strategies for purposes of efficiency.

Various parameters and variables of an exemplary optimal carton set searching operation may include:

| | Parameters |
|---|---|
| i | Total number of orders, i = 1, 2 ... n |
| j | Total number of cartons, j = 1, 2 ... m |
| k | Total number of cartons selected |
| $V_{ij}$ | =1 if Order i fits into Carton j; = 0 otherwise |
| $C_{ij}$ | The cost of shipping Order i in Carton j |
| | Variables |
| $x_{ij}$ | =1 if Order i is shipped via Carton j; = 0 otherwise |
| $y_j$ | =1 if Carton j is selected; = 0 otherwise |

During the carton set searching step, an objective function may be used to minimize the total shipping cost of the carton set, and maximize the total carton utilization rate. An exemplary objective function may be expressed as:

$$\min C_{ij} x_{ij}$$

Various factors are considered in order to calculate, for example, the void space when using a given carton to contain a given order, the shipping cost for each given order using a given carton, the void space rate, the shipping cost and carton void space rate of a given order by determining the most fitted carton from a given carton set, and the total shipping cost and total void space rate for all orders. Exemplary constraints may be expressed as:

| Expression | Constraint |
|---|---|
| $x_{ij} \leq V_{ij}$ | Volume feasibility constraint |
| $x_{ij} \leq y_j$ | Carton can only be used when selected |
| $\sum_{j=1}^{m} x_{ij} = 1$ | Each order should be shipped and shipped only once |
| $\sum_{j=1}^{m} y_j = k$ | Total number of cartons selected |

An exemplary objective function algorithm may be carried out as follows:

| | |
|---|---|
| Objective function: | (1) |
| Minimize Ci Ri | |
| Subject to: | |
| $V_{jk}=\{V_j, \text{if } V_{jk} \geq 0 \; \infty, \text{if } V_{jk} < 0$ , for $V_{jk}= V_j-V_k$ | (2) |
| $C_{jk}=\{c_j, \text{if } V_{jk} \geq 0 \; \infty, \text{if } V_{jk} < 0$ , for $V_{jk}= V_j-V_k$ | (3) |
| $R_{jk}=v_{jk}V_k$ , for $V_{jk}= V_j-V_k$ | (4) |
| $C_{ik}=\min\{C_{jk}, \forall \text{ j in i}\}$ | (5) |
| $R_{ik}=\min\{R_{jk}, \forall \text{ j in i}\}$ | (6) |
| $R_i= \Sigma R_{ik \text{all } k}$ | (7) |
| $C_i= \Sigma C_{ik \text{all } k}$ | (8) |

In this exemplary objective function algorithm, the first set of constraints is expressed as equation (2), which operates to calculate the void space using a carton j to contain an order k. If the carton cannot fit the order, the void space is set to an extremely large number. The shipping cost is then determined for each order k using carton j using the same approach, i.e., setting the value to infinity if carton j cannot fit order k. The void space rate of an order, which is determined by equation (4), is calculated by dividing the void space by the total space of the carton. For a candidate carton set i, the 5th and 6th constraints represented by equations (5) and (6), are used to calculate the shipping cost and carton void space rate of an order k using solution i, by determining the most fitted carton j from carton set i. The 7th and 8th constraints represented by equations (7) and (8) are subsequently used to calculate the total shipping cost and total void space rate for all orders.

As mentioned above, the carton set searching step of an exemplary carton optimization method preferably employs a heuristic strategy for purposes of efficiency. In an exemplary embodiment, described further below, a genetic algorithm is used to determine an optimal carton set for a given order sample. Given all the cubed cartons determined from the previous order cubing operation and a current given carton set, the genetic algorithm may be used to determine an optimal carton set containing a certain number of cartons after a certain number of generations, as given any order in the sample, there exists at least one carton having an optimal fit therewith. The determined optimal carton set will not only fit all orders, but the use thereof will also result in less shipping costs in comparison to use of the original carton set.

In applying the genetic algorithm to the problem of finding an optimal carton set, the population of interest is the reduced number of feasible carton sets resulting from application of the above-described pre-searching adjustment step, and the candidates (individuals) in the population are the individual carton sets within the total number of feasible carton sets to be analyzed by the genetic algorithm. The following equation is then representative of a chromosome of an individual of the population:

$$Bi=b1b2b3 \ldots bm \; b_j=0 \text{ or } 1, \forall j \in N, \text{ if } 1 \leq j \leq m \text{ and } \Sigma bjm1=nc \quad (1)$$

where, the string has m entries; and for each entry $b_j$ of an individual in the population, if carton j, the carton at $j^{th}$ position in i, is in candidate carton set i, then $b_j=1$; if not, $b_j=0$. There must be exactly nc cartons in one candidate carton set, and nc is chosen by the user.

A fitness function may also be employed. The fitness function (equation (2) below) is a function of the shipping cost and the void space percentage of all orders using carton set i. The only criterion for evaluating the solution is the total shipping cost of each possible solution.

$$\text{Minimize } Ti \quad (2)$$

Subject to:

$$Ti = Ci \quad (3)$$

Various parameters of an exemplary genetic algorithm for determining an optimal carton set may include the following:

| | |
|---|---|
| np | Population Size, the number of candidate carton set |
| nc | The number of cartons in one candidate carton set |
| P | Population of one generation |
| bj | Binary value for carton selection; 1 if selected, 0 otherwise |
| Bi | The binary representation of a carton set |
| K | The Generation Counter |
| Lk | The List of orders in the sample |
| Cjk | The cost of order k using carton j |
| Cik | The cost of order k using candidate carton set i |
| Ti | The total cost using candidate carton set j |
| Cj | The shipping cost of carton j. |
| m | Total Number of candidate cartons |
| Vjk | The void space of carton j, when fitting order k. |
| Li | The cubed Carton List |
| I | Candidate carton set index |
| J | Cubed Carton Index |
| k | Sample Order Index |
| Vk | The total volume of order k |
| Vj | The total inner volume of carton j |
| Rjk | The void space rate for order k using carton j |
| Rik | The void space rate for order k using carton i |
| wr | weight for total void space rate in a function |
| wc | weight for total shipping cost |

Figure 17:
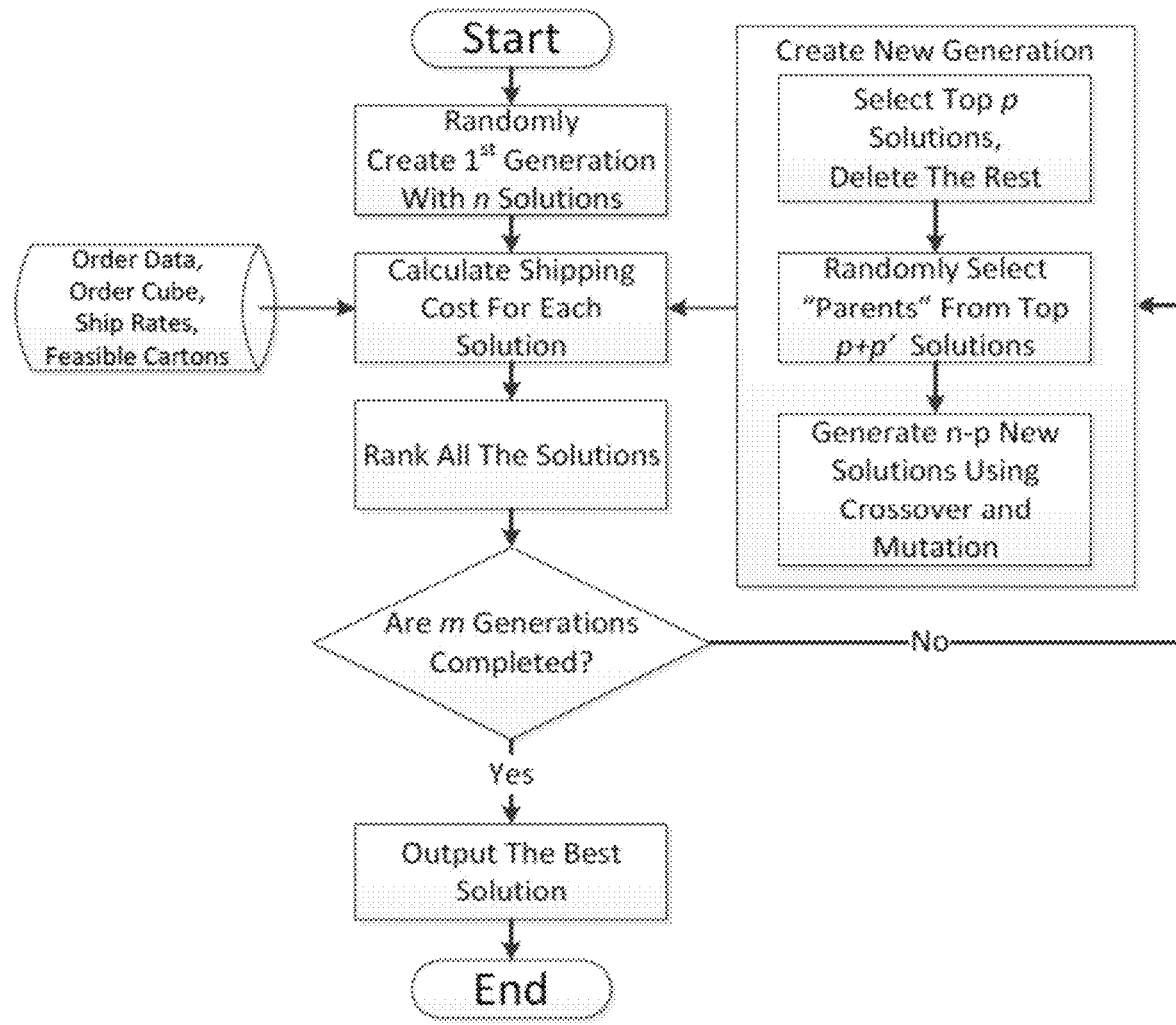
FIG. 17 is a flow diagram that illustrates generally the steps of an exemplary carton optimization genetic algorithm of an exemplary carton optimization method.

A flowchart illustrating the general functionality of an exemplary genetic algorithm designed to determine an optimal carton set is provided in FIG. 17. As indicated, upon initiating the genetic algorithm, a first generation of n solutions is randomly created. Using order data, cubed order data, shipping rates and feasible carton sizes, the algorithm then proceeds to calculate a shipping cost for each of the randomly created first generation solutions. All of the solutions are then ranked. The algorithm next considers whether m generations have been completed. If the answer is "yes", the algorithm outputs the optimal carton set. If the answer is "no", the algorithm proceeds to create a new generation by first selecting the top (best) of the previously created solutions and deleting the rest; randomly selecting "parents" from the top p+p solutions; and generating new n−p solutions by utilizing crossover (recombination) and mutation genetic operators. The n−p new solutions are then fed back to the shipping cost calculation step to calculate shipping costs for the solutions (again using order data, cubed order data, shipping rates and feasible carton sizes), and the process continues until an optimal carton set is found.

One exemplary embodiment of a unique genetic algorithm for determining an optimal carton set that expresses the functionality described above, may be expressed as follows:

| | |
|---|---|
| function GENETIC-ALGORITHM(population,FITNESS-FN) | |
| inputs: population,a set of individuals FITNESS-FN,a | (6) |
| function that measures the fitness of an individual | |
| repeat new-population←empty sorted set according to | (7) |
| FITNESS-FN | |
| new population ←REPRODUCE(population,FITNFSS-FN) | (8) |
| for all children in the solution | (9) |
| if (some random probability) then child ←MUTATE(child ) | (10) |
| population ←new_population | (11) |
| until some individual is fit enough,or enough time has elapsed | (12) |
| return the best individual in population,according to | (13) |
| FITNESS-FN | |

It should be noted that the exemplary genetic algorithm expressed above is different from a traditional genetic algorithm. The genetic algorithm used here is different from traditional genetic algorithms based on at least the following aspects: (1) the chromosome length varies on average from 150-300, which is much higher in comparison to traditional genetic algorithms; (2) the child chromosomes (solutions) in the genetic algorithm methodology herein, come from multiple parent chromosomes based on probability of selection, whereas in traditional genetic algorithms this is done using two parent chromosomes; and (3) traditional genetic algorithms have not been used in solving problems such as carton optimization as described herein. In line (6) of the algorithm, two input parameters of the genetic algorithm are received. These input parameters are the Fitness function (see above and below) and the initial population with np individuals. The algorithm subsequently runs a loop of K generations until an acceptably fitting carton set solution is produced (see line (7)-line (13)). This is accomplished by first initiating an empty sorted set (line (7)) to store all individuals (candidate solutions) as a new generation, where a sorted set is defined as a priority set in which the priority of an individual depends on its Fitness function value (i.e., the individual with the lowest shipping cost would have higher priority in this example). The algorithm then loops through all individuals of the population set to generate the next generation (see lines (9)-(12)).

A new function REPRODUCE is called in line (8). The REPRODUCE function is used to reproduce the population set of the new generation. An exemplary reproduction function algorithm may be expressed as follows:

| | |
|---|---|
| function REPRODUCE(population,FITNESS-FN,$n_c$) returns an individual | |
| inputs: population,a set of individuals FITNESS-FN,a function | (15) |
| that measures the fitness of an individual | |
| new_ population ←{top half fitted individuals] | (16) |
| while size(new_ population < SIZE(population) | (17) |
| child ← a string of LENGTH (individual) with all entries equal | (18) |
| to 0 | |
| count ←0 | (19) |
| pos ←1 | (20) |
| while count< $n_c$ | (21) |
| x ←RANDOM−INTEGER(1,SIZE( population )2) | (22) |
| if (population(x).Entry(pos)=1) | (23) |
| INCREASE(count,1) | (24) |
| Child.Entry( pos ) ← 1 | (25) |
| INCREASE( pos,1 ) | (26) |
| add child to new_population | (27) |
| return new_popultation | (28) |

The REPRODUCE function of this exemplary genetic algorithm is different from the traditional genetic algorithm. According to this exemplary reproduction function, the size of the population is made consistent for each generation, and then the individuals ranked in the first half of the population set are directly taken into the new generation (see line 16)). A modification is also made to the crossover (recombination) step (lines 17-25), such that 100 elites from the previous generation will be taken as parents to generate children for the other half of the population.

A child individual is initiated by assigning a string of all zeros as its chromosome. For each child individual, any of its genes (one entry of the binary string) can inherit the matched positioned gene of a randomly selected parent. A binary representation is used for each individual with length m, with an exact nc number of one in each entry of the string. To resolve the problem of making all children have an exact nc number of ones in its binary representation, a new variable count is used in line (19) to count the number of ones in the chromosome of each child. When this counter is equal to nc, the inheritance is completed (see lines 21-25). Ultimately, a new population with size np returned (see line 28).

Per certain probability, a mutation function is then applied to randomly selected candidate solutions. An exemplary mutation function algorithm may be expressed as follows:

| function Mutate(individual) | |
|---|---|
| inputs: individual,a single child with binary bit string representation | (29) |
| repeat | (30) |
| x←RANDOM–INTEGER(1,LENGTH (individual) ) | (31) |
| y←RANDOM–INTEGER(1,LENGTH (individual) ) | (32) |
| until individual.Entry(x)≠individual.Entry(y) | (33) |
| SWAP(individual.Entry(x),individual.Entry (y) ) | (34) |
| return individual | (35) |

This mutation function only modifies the chromosome of one individual. The algorithm will keep selecting two random genes from the passed-in individual until there are two genes with one having a zero value and one having a value of 1 (see lines 30-33). The position of those two genes is then swapped to obtain a new chromosome for the given individual (see line 34).

After k generations of reproduction, the Fitness function value of the best individual will converge to that of the optimal solution. The best individual of that generation is then returned as the optimal carton set solution. The output of the method may be in the form of tables, graphs and/or other forms through which adequate details of the new optimal carton set are provided.

EXAMPLE

In one real-world example of using an exemplary method of the inventive concept to determine an optimal carton set, an order sample was taken in the manner described above from a warehouse that processes approximately 4,000,000 eCommerce orders per year.

The results of this experiment are displayed in the table of FIG. 18. The first row of the table provides comparison data based on use of the current carton set. The following rows display the experimental results obtained by using optimization method-determined carton set solutions with different numbers of cartons. If it is desired to keep the same number of cartons in the new carton set as are in the currently used carton set, then the optimized 15 carton set would be the selected solution.

It can be observed from the table that the Dimensional Weighing hit rate resulting from use of the optimized 15 carton set will decrease and the carton space utilization percentage will increase. Additionally, based on the formula:

$$\text{Annual Savings} = \frac{\text{Sample Orders' Shipping Cost Savings}}{\text{Sample Size}} \times \text{Annual \# of Orders}$$

the table indicates an annual shipping cost reduction of 4.80% can be achieved by switching to use of the optimized 15 carton set. From the last three columns of the table, it can also be understood that the carton space utilization percentage and the amount of shipping cost savings increases, and the Dimensional Weighing hit rate decreases, as the number of cartons in the optimal carton set size increases. Consequently, an even greater savings may be achieved by selecting an optimal carton set with a greater number of cartons.

Figure 19:
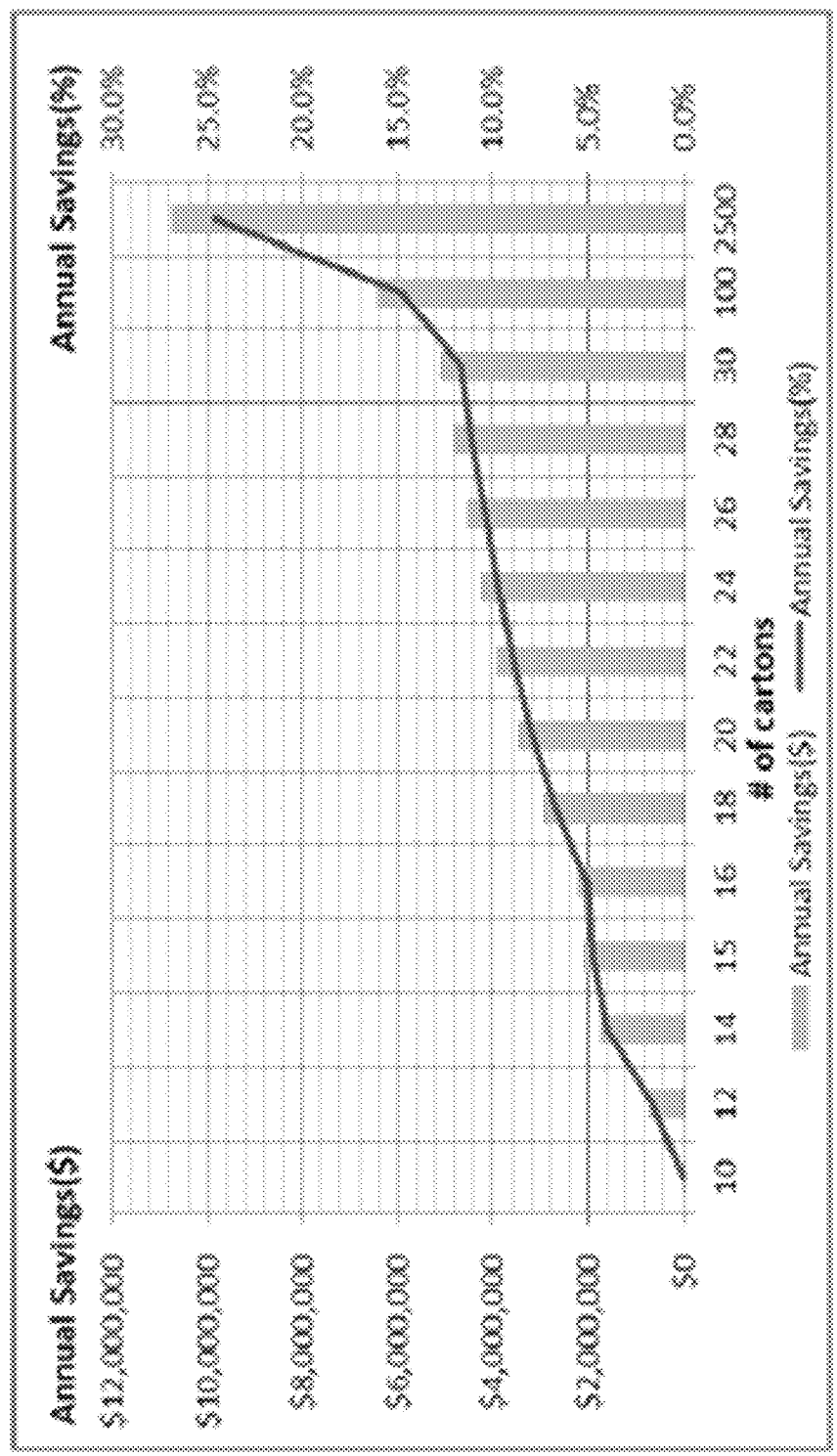
FIG. 19 is a graph illustrating how the shipping cost savings represented by the data in the table of FIG. 18 trends with the number of cartons in the optimal carton set.

The positive relationship between the carton set cardinality and annual savings can be observed quite clearly from the graph of FIG. 19. As shown, what is essentially a "make to order" solution (i.e., a carton for every possible order combination) returns the best savings, but would require 2,500 different cartons and also the purchase and operation of a carton-making machine. Thus, such a solution is typically not practicable in a high-volume shipping setting as used in this example. A typical carton set may instead contain around 8-20 different cartons, but a significantly different number of cartons per carton set is also certainly possible depending on the setting.

The exemplary embodiments described and shown herein are directed particularly to typical ecommerce shipping scenarios where a given order will always fit into a single carton. It should be realized, however, that the exemplary carton optimization methods may also be adapted to cover situations where more than one carton per order is required. Therefore, while certain exemplary embodiments of the general inventive concept are described in detail above for purposes of illustration, the scope of the general inventive concept is not considered limited by such disclosure, and modifications are possible without departing from the spirit of the general inventive concept as evidenced by the following claims:

What is claimed is:

1. A system for carton optimization, comprising:
at least one computer with computer-readable program code stored thereon, the at least one computer in communication with a carton-making machine, a computerized warehouse management system, and a data store, the data store in communication with the computerized warehouse management system, and the data store storing goods order data associated with past goods orders received by a shipper;
wherein the computer-readable program code is configured to:
receive from the data store a data sample containing a number of the past goods orders;
perform a pre-order cubing adjustment operation to calculate a reduced number of feasible cartons that will fit the goods orders contained in the data sample;
perform an order cubing operation to calculate a best fitted carton for each goods order contained in the data sample, which results in a set of optimally fitted cartons for all goods orders in the data sample;
perform an optimal carton set searching step by applying a specialized genetic algorithm with the reduced number of feasible cartons resulting from the previous pre-order cubing adjustment operation serving as an input;
identify an optimized carton set containing a plurality of cartons of different dimensions that collectively fit all goods orders in the data sample;
calculate a number/percent of future orders that will use each carton size within the optimized carton set;
instruct the automated carton-making machine to produce various shipping cartons of the optimized carton set in the predicted required quantities thereof; and wherein the size of the data sample is based on an equation selected from the group consisting of:

$$n = \frac{4}{W^2}$$

where W is in the range of sample values, and $$n_1 = \left[\frac{\frac{Z_\alpha}{2} \times \sigma}{E}\right]^2$$

where E is the maximum error, σ is the standard deviation, and Z is the critical cutoff value, resulting in a 1−α confidence level that the sample mean will fall within the maximum error E around the population mean.

2. The system for carton optimization of claim 1, wherein the computer-readable program code is configured to perform the pre-order cubing adjustment operation prior to the order cubing operation.

3. The system for carton optimization of claim 2, wherein the pre-order cubing adjustment operation combines all items of identical or substantially identical dimensions in a given order into a single item for analysis purposes.

4. The system for carton optimization of claim 3, wherein the computer-readable program code is further configured to perform the pre-order cubing adjustment operation according to the following algorithm:

| | |
|---|---|
| Procedure Items-Reducing(Order_Set) | |
| inputs: Order_Set,a set containing all orders, and each order is a set with all items | (1) |
| for each Order k in Order_Set | (2) |
| new_order← empty Set | (3) |
| Key ←{length,width,height} | (4) |
| for each item i in Order k | (5) |
| if new_order contains i, | (6) |
| Increase the value of hi | (7) |
| Increase the value of wti | (8) |
| REORDER ( hi,wi,li ) | (9) |
| Key is reserved, even if the dimension has been changed | (10) |
| else then, add i into new_order | (11) |
| Replace order k with new_order in order_set | (12) | where the new order is a set of items, and the length, width and height of each item in the set is used as a key for each item, and where it is assumed that length is the largest dimension, height is the smallest dimension, and width is the in-between dimension.

5. The system for carton optimization of claim 1, wherein the computer-readable program code is further configured to execute a Modified Large Area Fits First (MLAFF) algorithm and perform the following steps:
creating an item dimension list for all items in a given goods order contained in the data sample, the list comprising lengths and widths of each item in the given goods order;
sorting the item dimension list according to dimension size;
identifying the largest and second largest dimensions on the item dimension list as the length and width dimensions of the selected carton;
calculating an area for each item by multiplying the length and width of each item;
arranging the items in the order according to area, beginning with the item of largest calculated area.

6. The system for carton optimization of claim 1, where the computer-readable program code is further configured to:
perform a pre-searching adjustment operation in which the number of possible combinations present in the set of optimally fitted cartons generated by the order cubing operation is narrowed down, starting with $n_1$ cubed cartons and ending up with $n_{f2}$ feasible cartons that are used for searching;
where $n_1 \geq n_{f2}$;
wherein the pre-searching adjustment operation results in the construction of a new finalized cubed carton set that includes all representative cartons having similar dimensions; and
wherein the carton with largest length, width and height dimensions of the set is taken to be the representative of the set.

7. A system for carton optimization, comprising:
at least one computer configured to execute computer-readable program code, the at least one computer in communication with a carton-making machine and a data store, the data store storing goods order data associated with past goods orders received by a shipper;
wherein the computer-readable program code is configured to:
receive from the data store a data sample containing a number of the past goods orders;
perform an order cubing operation to calculate a best fitted carton for each goods order contained in the data sample, which results in a set of optimally fitted cartons for all goods orders in the data sample;
identify an optimized carton set containing a plurality of carton sizes having different dimensions that collectively fit all goods orders in the data sample;
calculate a number of future goods orders that will use each carton size within the optimized carton set;
instruct the automated carton-making machine to produce various shipping cartons of the optimized carton set in the predicted required quantities thereof; and
wherein the size of the data sample is based on an equation selected from the group consisting of:

$$n = \frac{4}{W^2}$$

where W is in the range of sample values, and $$n_1 = \left[\frac{\frac{Z_\alpha}{2} \times \sigma}{E}\right]^2$$

where E is the maximum error, σ is the standard deviation, and Z is the critical cutoff value, resulting in a 1−α confidence level that the sample mean will fall within the maximum error E around the population mean.

8. The system for carton optimization of claim 7, wherein the computer-readable program code is further configured to execute a Modified Large Area Fits First (MLAFF) algorithm and perform the following steps:
create an item dimension list for all items in a given goods order contained in the data sample, the list comprising lengths and widths of each item in the given goods order;
sort the item dimension list according to dimension size;
identifying the largest and second largest dimensions on the item dimension list as the length and width dimensions of the selected carton;
calculating an area for each item by multiplying the length and width of each item;
arranging the items in the order according to area, beginning with the item of largest calculated area.

9. A shipping optimization method for a shipper of goods, comprising:
providing a computer-based carton optimization system, the carton optimization system comprising:
a data store, the data store storing goods order data associated with past goods orders received by the shipper, and
at least one computer in communication with the data store, the at least one computer running specialized carton optimization software;
using the at least one computer to retrieve from the data store a data sample containing a number of the past goods orders;
using the at least one computer and associated carton optimization software to perform a pre-order cubing adjustment operation that results in a reduced number of feasible cartons that will fit the goods orders contained in the data sample;
using the at least one computer and associated carton optimization software to perform an order cubing operation to determine a best fitted carton for each goods order contained in the data sample, which results in a set of optimally fitted cartons for all goods orders in the data sample;
using the at least one computer and associated carton optimization software to determine an optimized carton set containing a plurality of cartons of different dimensions that will collectively fit all goods orders in the data sample and will also reduce dimensional weighing shipping cost;
using the at least one computer and associated carton optimization software to predict how many future orders will use each carton size within the optimized carton set;
by way of instructions from the carton optimization system, causing an automated carton-making machine in communication with the carton optimization system to produce the various shipping cartons of the optimized carton set in the predicted required quantities thereof; and
using the cartons of the optimized carton set for shipping order items of subsequently-received orders;
wherein an acceptable data sample size is based on an equation selected from the group consisting of:

$$n = \frac{4}{W^2}$$

where W is in the range of sample values, and $$n_1 = \left[\frac{\frac{Z_\alpha}{2} \times \sigma}{E}\right]^2$$

where E is the maximum error, $\sigma$ is the standard deviation, and Z is the critical cutoff value, resulting in a 1−$\alpha$ confidence level that the sample mean will fall within the maximum error E around the population mean.

* * * * *

UNITED STATES PATENT AND TRADEMARK OFFICE
CERTIFICATE OF CORRECTION

| | | |
|---|---|---|
| PATENT NO. | : 12,008,511 B2 | Page 1 of 1 |
| APPLICATION NO. | : 18/067930 | |
| DATED | : June 11, 2024 | |
| INVENTOR(S) | : Manjeet Singh et al. | |

It is certified that error appears in the above-identified patent and that said Letters Patent is hereby corrected as shown below:

In the Specification

Column 5, Line 53, please insert "≥" before 8 GM RAM.

Column 5, Line 53, please insert "≥" before 2 GHz Processor.

Signed and Sealed this
Twenty-seventh Day of May, 2025

Coke Morgan Stewart
*Acting Director of the United States Patent and Trademark Office*